United States Patent
Sana

(10) Patent No.: US 12,459,170 B2
(45) Date of Patent: Nov. 4, 2025

(54) MOLD FOR MANUFACTURING COMPOSITE MATERIAL MOLDED PRODUCT, AND METHOD FOR MANUFACTURING COMPOSITE MATERIAL MOLDED PRODUCT

(71) Applicant: Kawasaki Jukogyo Kabushiki Kaisha, Kobe (JP)

(72) Inventor: Toshikazu Sana, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/575,637

(22) Filed: Jan. 14, 2022

(65) Prior Publication Data

US 2022/0134687 A1    May 5, 2022

Related U.S. Application Data

(60) Division of application No. 16/988,725, filed on Aug. 10, 2020, now abandoned, which is a division of
(Continued)

(30) Foreign Application Priority Data

Sep. 7, 2017   (JP) ................................. 2017-172195

(51) Int. Cl.
*B29C 43/32*     (2006.01)
*B29C 70/46*     (2006.01)
(Continued)

(52) U.S. Cl.
CPC .............. *B29C 43/32* (2013.01); *B29C 70/46* (2013.01); *B29K 2101/10* (2013.01); *B29K 2105/0809* (2013.01)

(58) Field of Classification Search
CPC ......... B29C 43/32; B29C 70/46; B29C 43/36; B29C 43/18; B29C 43/52; B20C 2043/3205
(Continued)

(56) References Cited

U.S. PATENT DOCUMENTS

| | | | | |
|---|---|---|---|---|
| 4,755,341 A | * | 7/1988 | Reavely | B29C 70/44 425/389 |
| 5,190,773 A | * | 3/1993 | Damon | B29C 43/32 425/417 |

(Continued)

FOREIGN PATENT DOCUMENTS

| | | |
|---|---|---|
| DE | 10 2009 036584 A1 | 2/2011 |
| EP | 2 637 832 A2 | 9/2013 |

(Continued)

OTHER PUBLICATIONS

English Translation of Shima JP2005288756 (Year: 2005).*

(Continued)

*Primary Examiner* — Michael A Tolin
*Assistant Examiner* — Hana C Page
(74) *Attorney, Agent, or Firm* — XSENSUS LLP

(57) ABSTRACT

A composite material molded product has a hollow portion, a bent portion, or a curved portion in a transverse section thereof. When the composite material molded product has, for example, a bent portion, a surface on an inside of the bent portion is a pressed surface. A mold includes a pressing body that is thermally expandable and has an outer surface shape corresponding to a shape of a pressed surface, and a mold main body including a cavity accommodating the laminate and the pressing body inside, the cavity including an inner surface shape corresponding to a shape other than the pressed surface. The cavity is sealed in a state that the pressing body is disposed in the cavity. The laminate is
(Continued)

accommodated in a molding space formed between an inner surface of the cavity and an outer surface of the pressing body.

13 Claims, 16 Drawing Sheets

Related U.S. Application Data application No. 16/809,551, filed on Mar. 5, 2020, now abandoned, which is a continuation of application No. PCT/JP2018/033055, filed on Sep. 6, 2018.

(51) Int. Cl.
*B29K 101/10* (2006.01)
*B29K 105/08* (2006.01)

(58) Field of Classification Search
USPC .......................................................... 264/512
See application file for complete search history.

(56) References Cited

U.S. PATENT DOCUMENTS

| | | | |
|---|---|---|---|
| 7,204,951 B2* | 4/2007 | Simpson | B29C 70/342 |
| | | | 264/573 |
| 10,486,375 B2* | 11/2019 | Hosokawa | B29D 99/0007 |
| 10,773,472 B2 | 9/2020 | Takano et al. | |
| 2007/0096368 A1 | 5/2007 | Hanson et al. | |
| 2008/0023093 A1* | 1/2008 | Mobley | B29C 43/021 |
| | | | 138/121 |
| 2010/0270225 A1 | 10/2010 | Haecker et al. | |
| 2013/0299672 A1 | 11/2013 | Perrier et al. | |
| 2013/0299872 A1 | 11/2013 | Chang et al. | |
| 2013/0327471 A1 | 12/2013 | Hedley et al. | |
| 2013/0327477 A1 | 12/2013 | Hollensteiner et al. | |
| 2016/0059500 A1 | 3/2016 | Hosokawa et al. | |
| 2016/0339615 A1* | 11/2016 | Abe | B29D 99/0014 |
| 2019/0176412 A1 | 6/2019 | Maeda et al. | |
| 2019/0270225 A1 | 9/2019 | Takano et al. | |
| 2020/0238638 A1* | 7/2020 | Toriyama | B29C 44/445 |

FOREIGN PATENT DOCUMENTS

| | | | |
|---|---|---|---|
| JP | 51-097676 A | | 8/1976 |
| JP | 51-097876 A | | 8/1976 |
| JP | 57-125020 A | | 8/1982 |
| JP | 2009-513391 A | | 4/2009 |
| JP | 2014-012399 A | | 1/2014 |
| JP | 2015-071239 A | | 4/2015 |
| WO | WO89/03293 | * | 4/1989 |
| WO | 96/09159 A1 | | 3/1996 |
| WO | 2014/192601 A1 | | 12/2014 |
| WO | 2018/079824 A1 | | 5/2018 |

OTHER PUBLICATIONS

Iwazawa (English Translation of JP2010234676) (Year: 2010).*
Extended European Search Report issued Mar. 23, 2020 in European Application No. 18854655.0.
Shima (English Translation of JP2005288756). (Year: 2005).
Xu (English Translation of CN 102806668) (Year: 2016).

* cited by examiner

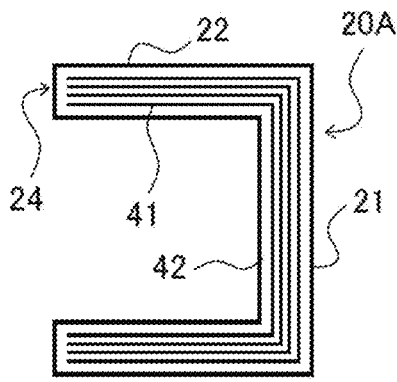
Fig. 6A
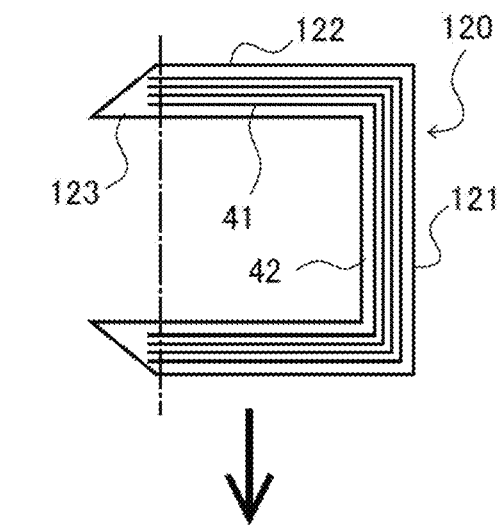
Fig. 6B
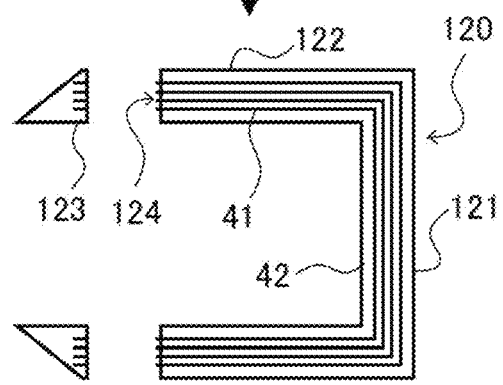
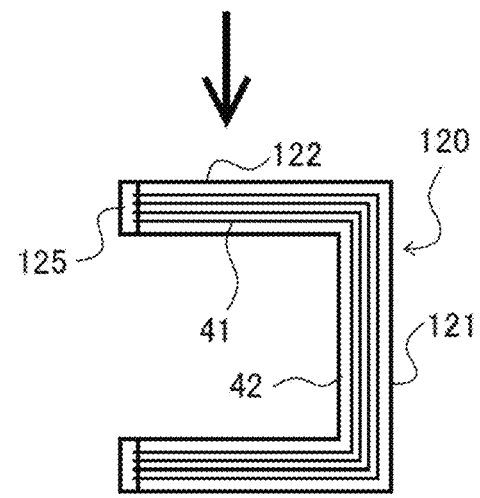

MOLD FOR MANUFACTURING COMPOSITE MATERIAL MOLDED PRODUCT, AND METHOD FOR MANUFACTURING COMPOSITE MATERIAL MOLDED PRODUCT

CROSS-REFERENCE TO RELATED APPLICATIONS

The present application is a divisional of U.S. application Ser. No. 16/988,725, filed Aug. 10, 2020, which is a divisional of U.S. application Ser. No. 16/809,551, filed Mar. 5, 2020, which is a bypass continuation of PCT Application No. PCT/JP2018/033055, filed Sep. 6, 2018, which claims priority to JP 2017-172195, filed Sep. 7, 2017, the entire contents of each are incorporated herein by reference.

TECHNICAL FIELD

The present application relates to a mold used for manufacturing a composite material molded product, and a method for manufacturing a composite material molded product.

BACKGROUND ART

In recent years, in fields where metal materials are used, fiber-reinforced resin composite materials (hereinafter abbreviated as "composite materials" as appropriate) are widely used. For example, a material of carbon fiber reinforced type (carbon fiber reinforced plastic: CFRP) using a carbon fiber as a reinforcing fiber, which is impregnated with a matrix resin such as an epoxy resin and molded, has higher strength in addition to being lighter than metal materials. Accordingly, molded products made of composite materials (composite material molded products) such as CFRP have come to be employed in a wide range of fields such as aerospace field, sporting-goods field, industrial machinery field, automobile field, bicycle field, and the like.

As a method for manufacturing (or a method for molding) a composite material molded product, typically, prepregs (obtained by impregnating fiber materials with a thermosetting resin composition which is a matrix material, and bringing it into a half-cured state) are stacked (laminated) in a desired shape to form a laminate (a stacked body). This laminate is disposed in a cavity in a mold and bagged, heated, and pressurized in an autoclave (pressure vessel) to cure the laminate, the mold is debagged, and then the cured product, that is, the composite material molded product is demolded.

Here, when a transverse section of the composite material molded product is hollow, an inner mold (core member) called a bladder or an inflatable mandrel is generally used.

The bladder is a bag-like member capable of expanding and contracting, and is expanded by pressurization during autoclaving. Thus, when the laminate and the bladder are accommodated in a cavity in the mold and autoclaved, the bladder is expanded and becomes an inner mold of a predetermined shape, and the laminate is pressed toward the mold that is an outer mold. In addition, since the bladder contracts after autoclaving, it can be pulled out from a hollow portion of the obtained cured product (composite material molded product).

In a conventional apparatus or method, typically, when a composite material molded product used in the aircraft field is manufactured, a flexible bladder is disposed in a hollow portion ("inner cavity") of a laminate ("composite charge") before curing, and a reservoir for pressurizing the bladder is separately provided. The reservoir and the bladder are joined to each other and sealed in a flexible bag. Accordingly, pressure by autoclaving is transmitted to the reservoir, and fluid in the reservoir is pushed into the bladder. In this manner, the bladder is properly pressurized, and thus a hollow portion or the like is formed in the composite material molded product.

However, the technique using an expansion type inner mold (core member) like the bladder is limited to the case where strictness of an inner surface shape of the composite material molded product is not required.

Specifically, as described above, since the bladder is expanded by pressurization during autoclaving, the bladder effectively functions as the "inner mold" for the "outer mold", but in a non-autoclaved state, it is a contracted bag-like object and cannot function as the "inner mold". Since the outer mold is generally a "metal mold" made of metal, during autoclaving, the outer mold imparts a desired shape to an outer surface of the laminate by pressing from the expanded bladder. On the other hand, the expandable and contractible bladder only pushes (presses) the laminate from the inside to the outside during autoclaving and cannot impart a desired shape to an inner surface of the composite material molded product.

Therefore, when the composite material molded product has a hollow portion, a bent portion, or a curved portion in the transverse section thereof, and not only the outer surface but also the inner surface is formed into a desired shape, it has not been possible to use a bladder.

SUMMARY

In order to solve the above-described problems, a mold for manufacturing a composite material molded product according to the present application is a mold used when manufacturing a composite material molded product made of a composite material constituted of at least a thermosetting resin composition and a fiber material and having a cross-sectional shape including at least one of a hollow, a bent portion, and a curved portion in a transverse section thereof, the mold used for heat curing a laminate of prepregs obtained by impregnating the fiber material with the thermosetting resin composition and half curing the thermosetting resin composition, in which when a surface on the hollow side or an inside or outside of the bent portion or the curved portion is a pressed surface in the transverse section of the composite material molded product, the mold includes a pressing body that is thermally expandable and has a pressure molding surface having a shape corresponding to a shape of the pressed surface, and a mold main body provided with a cavity accommodating the laminate and the pressing body inside, the cavity including an inner surface shape corresponding to a shape other than the pressed surface, in which the mold main body is configured such that the cavity is sealed in a state that the pressing body is disposed in the cavity, and the laminate is accommodated in a molding space formed between an inner surface of the cavity and the pressure molding surface of the pressing body.

Further, in order to solve the above-described problems, a method for manufacturing a composite material molded product according to the present application is a method for manufacturing a composite material molded product made of a composite material constituted of at least a thermosetting resin composition and a fiber material and having a cross-sectional shape including at least one of a hollow, a bent portion, and a curved portion in a transverse section thereof, in which when the hollow side or an inside or outside of the bent portion or the curved portion is a pressed surface in the transverse section of the composite material molded product, the method is configured to include using a mold including a pressing body that is thermally expandable and has a pressure molding surface having a shape corresponding to a shape of the pressed surface, and a mold main body provided with a cavity including an inner surface shape corresponding to a shape other than the pressed surface, disposing the laminate and the pressing body in the cavity so that the pressure molding surface of the pressing body abuts on a laminate of prepregs obtained by impregnating the fiber material with the thermosetting resin composition and half curing the thermosetting resin composition, and fixing the mold main body so as to seal the cavity, and heating the mold without pressing from outside, so as to cure the laminate.

The above object, other objects, features and advantages of the present application will be apparent from the following detailed description of preferred embodiments with reference to the attached drawings.

BRIEF DESCRIPTION OF DRAWINGS

FIG. 6A is a schematic cross-sectional view illustrating an example of a schematic model of a composite material molded product obtained by the method for manufacturing the composite material molded product according to the present disclosure.

FIG. 6B is a schematic process view illustrating by a schematic model an edge process of a composite material molded product obtained by the conventional method for manufacturing the composite material molded product.

DETAILED DESCRIPTION OF THE DRAWINGS

Figure 1A:
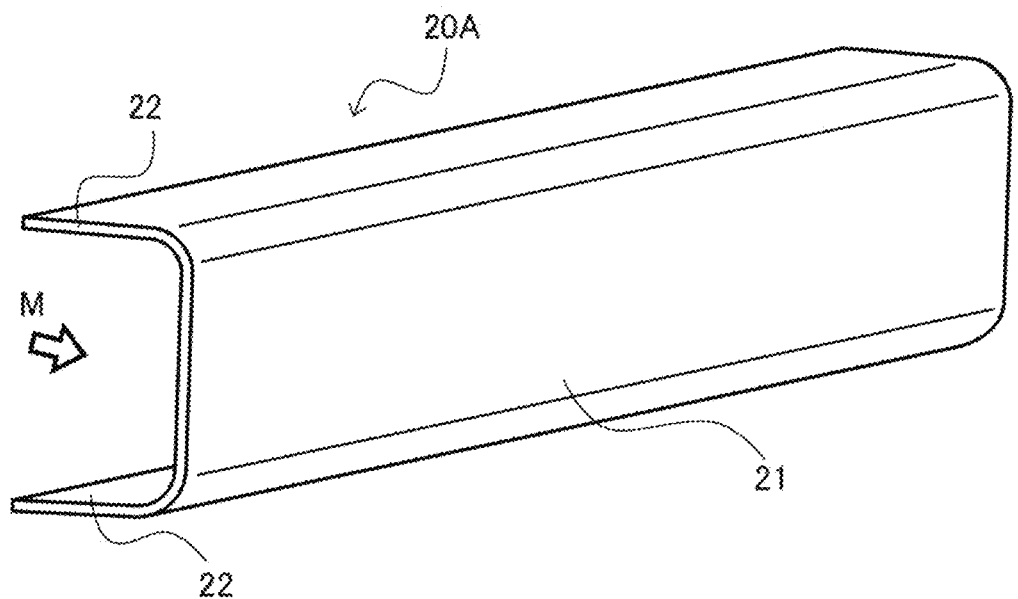
FIG. 1A is a schematic perspective view illustrating an example of a composite material molded product according to the present disclosure.

Hereinafter, representative embodiments of the present disclosure will be described with reference to the drawings. Note that in the following, the same or corresponding elements are denoted by the same reference numerals throughout all the drawings, and the redundant description will be omitted.

Embodiment 1

[Configuration Example of Composite Material Molded Product]

First, an example of a composite material molded product according to the present disclosure will be specifically described with reference to FIGS. 1A-1C. It is sufficient that a composite material molded product according to the present disclosure is made of a composite material constituted of at least a thermosetting resin composition and a fiber material, and is manufactured by heat curing a laminate (stacked body) of prepregs obtained by impregnating a fiber material with a thermosetting resin composition and half curing the thermosetting resin composition. However, the composite material molded product according to the present disclosure has a cross-sectional shape including at least one of a hollow, a bent portion, and a curved portion in a transverse section thereof.

Figure 1B:
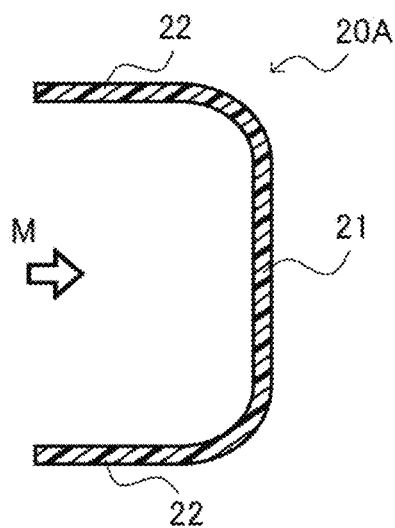
FIG. 1B and FIG. 1C are schematic cross-sectional views illustrating examples of cross-sectional shapes of the composite material molded product illustrated in FIG. 1A.
Figure 1C:
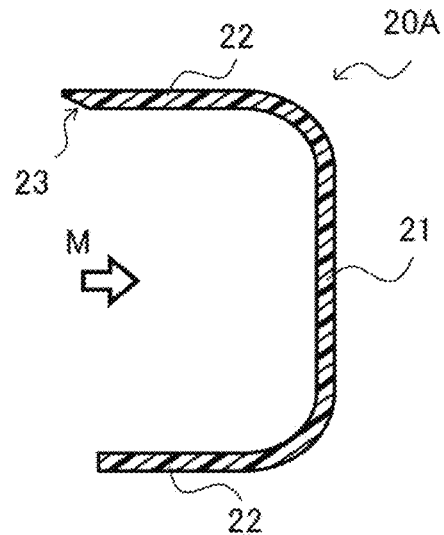

As illustrated in FIGS. 1A-1C, in present Embodiment 1, a C-shaped molded material 20A having a C-shaped cross section will be taken as the composite material molded product. When viewed from an end surface (FIG. 1A) or a cross section (FIG. 1B or FIG. 1C) end surface thereof, the C-shaped molded material 20A has a shape having a plate-shaped main body portion 21 (or a web) and two flange portions 22 bent in the same direction from both edges of the main body portion 21.

Note that a more specific cross-sectional shape of the C-shaped molded material 20A is not particularly limited. For example, as illustrated in FIG. 1B, in the C-shaped molded material 20A, the flange portions 22 may each have the same thickness from a position connected to the main body portion 21 to an edge thereof, and as illustrated in FIG.

1C, a distal end of at least one of the two flange portions 22 (the flange portion 22 on an upper side of the view in FIG. 1C) may be configured as a reverse cut portion 23 with a tapered thickness.

Further, the direction indicated by a block arrow M in FIG. 1A-FIG. 1C indicates a surface to be a "pressed surface", which will be described later, in the C-shaped molded material 20A. It is sufficient that the pressed surface is a surface on a hollow side or an inside of the bent portion or the curved portion in the transverse section of the composite material molded product. In the C-shaped molded material 20A illustrated in FIG. 1A-FIG. 1C, since the bent portion is constituted of the pair of flange portions 22 and the main body portion 21, opposing surfaces of the pair of flange portions 22 and a surface on the flange portion 22 side of the main body portion 21 form the pressed surface. In other words, the pressed surface is constituted of inner surfaces of the pair of flange portions 22 and an inner surface of the main body portion 21 continuous to these inner surfaces.

In the present disclosure, the composite material which is a material of the composite material molded product such as the C-shaped molded material 20A may be constituted of a fiber material and a thermosetting resin composition as described above. A specific repair of the fiber material is not particularly limited as long as it is capable of realizing favorable physical properties (strength and the like) in the composite material molded product. Examples of the fiber material can include carbon fiber, polyester fiber, polyparaphenylene benzobisoxazole (PBO) fiber, boron fiber, aramid fiber, glass fiber, silica fiber (quartz fiber), silicon carbide (SiC) fiber, nylon fiber, and the like. Only one type of these fiber materials may be used, or two or more types may be used in combination as appropriate. The use form of the fiber material is not particularly limited, but typically, it can be used as a base material constituted of a braid, a woven fabric, a knitted fabric, a non-woven fabric, or the like.

The thermosetting resin composition to be impregnated into the fiber material may be constituted of at least a thermosetting resin (matrix material), but may contain a material other than the thermosetting resin. Although the specific type of the thermosetting resin is not particularly limited, typical examples include epoxy resin, polyester resin, vinyl ester resin, phenol resin, cyanate ester resin, polyimide resin, polyamide resin, and the like. These thermosetting resins may be used as a single type, or may be used in combination of two or more types. Further, a more specific chemical structure of these thermosetting resins is not particularly limited, and may be a polymer obtained by polymerizing various known monomers, or a copolymer obtained by polymerizing plural monomers. In addition, the average molecular weight, the structure of the main chain and the side chain, and so on are not particularly limited.

The thermosetting resin composition may contain, in addition to the above-mentioned thermosetting resin, a known curing agent, a curing accelerator, a reinforcing material or filler other than the fiber base material, and other known additives. There are no particular limitations on the specific type, composition, and the like of these additives such as curing agents and curing accelerators, and materials of known types or compositions can be preferably used.

In the present disclosure, the composite material molded product is manufactured by stacking and curing prepregs as described above. A prepreg is a sheet body in which a base material constituted of a fiber material is impregnated with a thermosetting resin composition and brought into a half-cured state. The specific configuration of the prepreg is not particularly limited. Moreover, the specific configuration of the laminate formed by stacking (laminating) prepregs is also not specifically limited. For example, the shape of the prepreg, the number of stacked prepregs, the stacking direction of the prepregs, and the like can be appropriately set according to the shape, use, type, and the like of the composite material molded product to be obtained.

[Example of Configuration of Mold]

Figure 2:
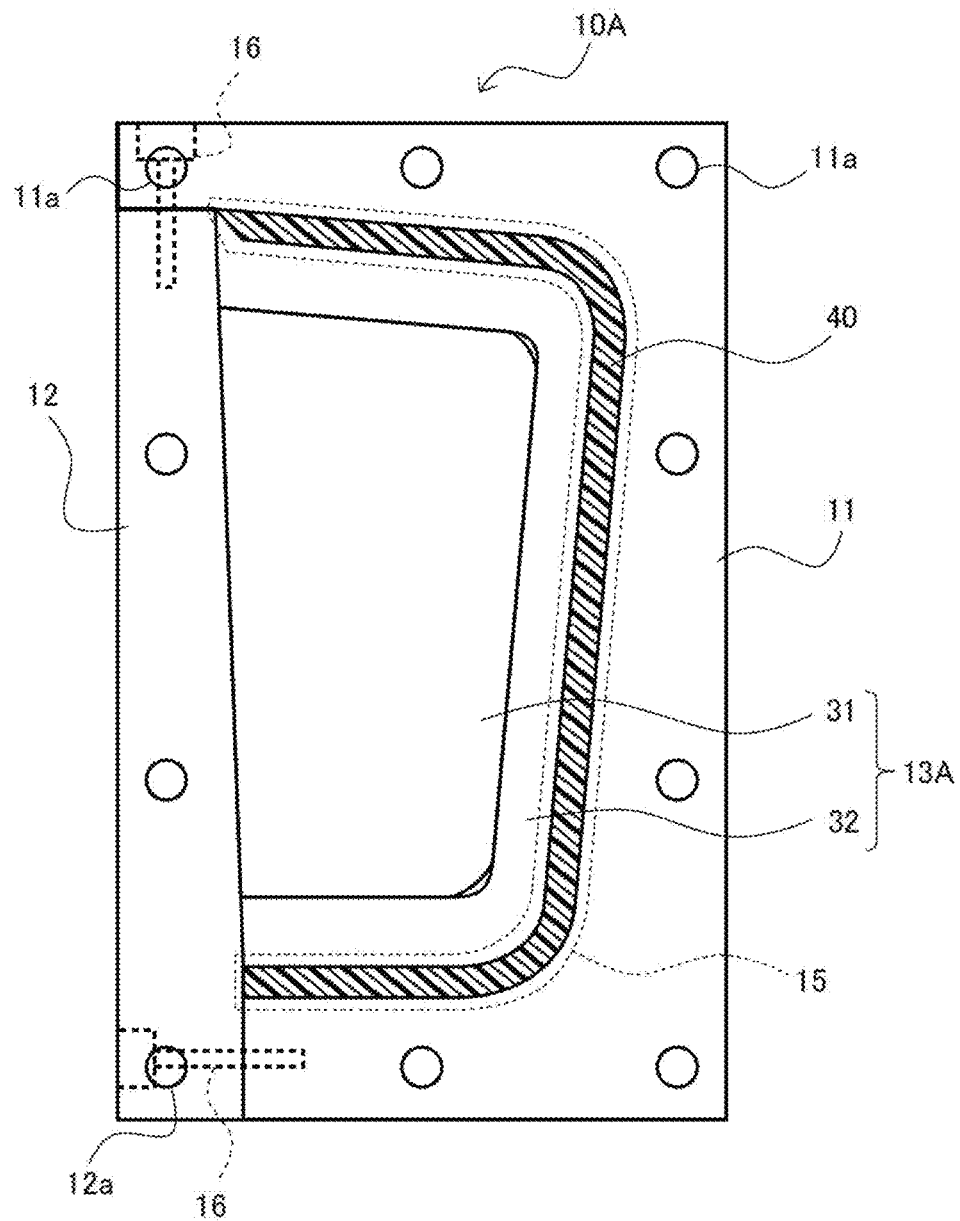
FIG. 2 is a schematic end surface view illustrating an example of a mold for manufacturing a composite material molded product according to Embodiment 1 of the present disclosure, and a configuration in a state that a lid mold portion at an end is not attached.
Figure 3:
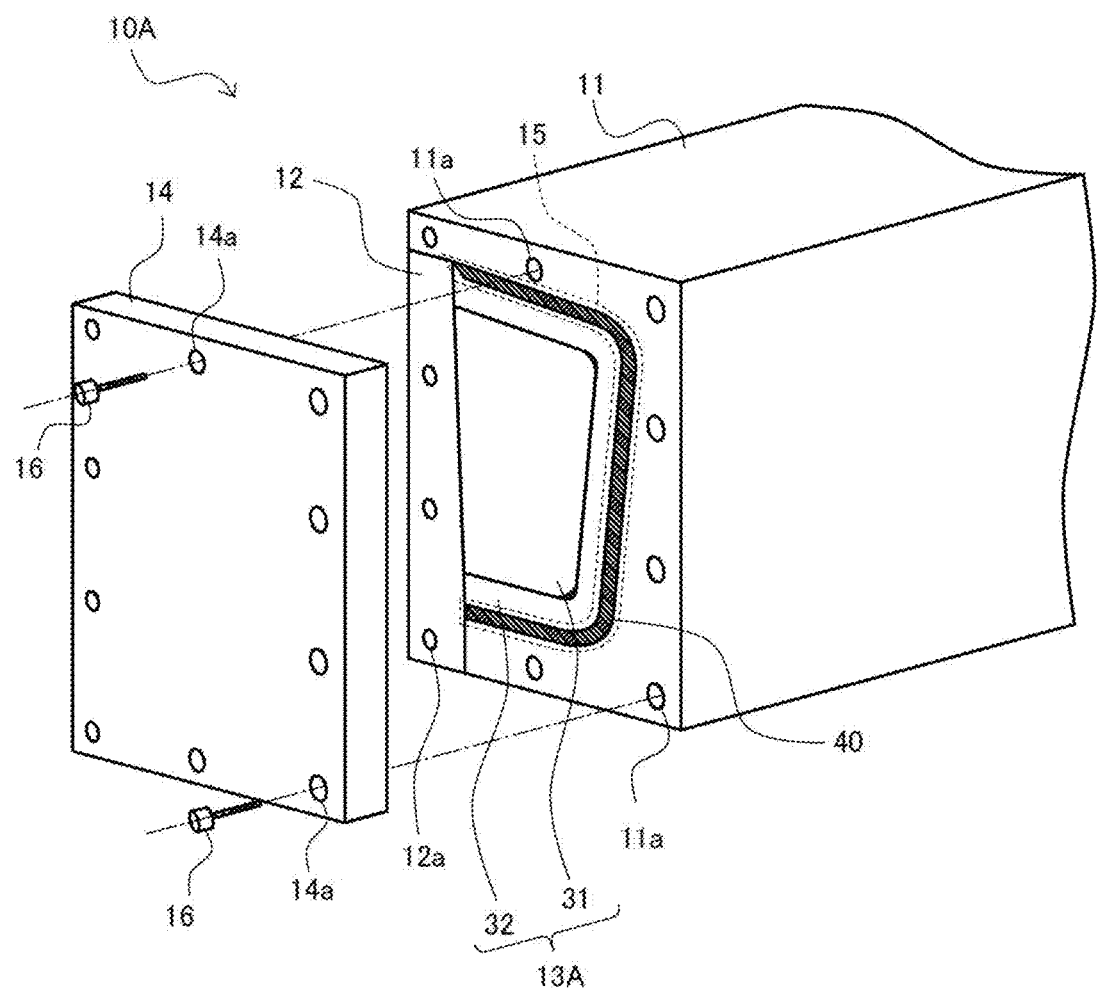
FIG. 3 is a schematic partial perspective view illustrating an example of a state in which a lid mold portion is attached to an end in the mold for manufacturing the composite material molded product illustrated in FIG. 2.

Next, a representative example of the mold (molding die) according to present Embodiment 1 used for manufacturing such a C-shaped molded material 20A will be specifically described with reference to FIGS. 2-4. As illustrated in FIG. 2 and FIG. 3, the mold 10A according to present Embodiment 1 includes a female mold portion 11, a side surface lid mold portion 12, a pressing body 13A, an end surface lid mold portion 14, and so on. As illustrated in FIG. 2, a molding space 15 is formed between the female mold portion 11 and the pressing body 13A. In the molding space 15, a laminate 40 which becomes the C-shaped molded material 20A by curing is held.

The laminate (stacked body) 40 is formed by stacking (laminating) a plurality of prepregs as described above. The molding space 15 is formed in the mold 10A as a space corresponding to the shape of the composite material molded product to be manufactured, the C-shaped molded material 20A in present Embodiment 1. Note that in FIG. 2 and FIG. 3, since the laminate 40 is "filled" in the molding space 15, the region corresponding to the molding space 15 is illustrated by enclosing with a dotted line. Further, in the laminate 40 illustrated in FIGS. 2-4, since the thickness of an edge on the upper side of the view is tapered, the C-shaped molded material 20A-be manufactured in present Embodiment 1 has a reverse cut portion 23 on an edge of one of the flange portions 22 (see FIG. 1C).

Figure 4:
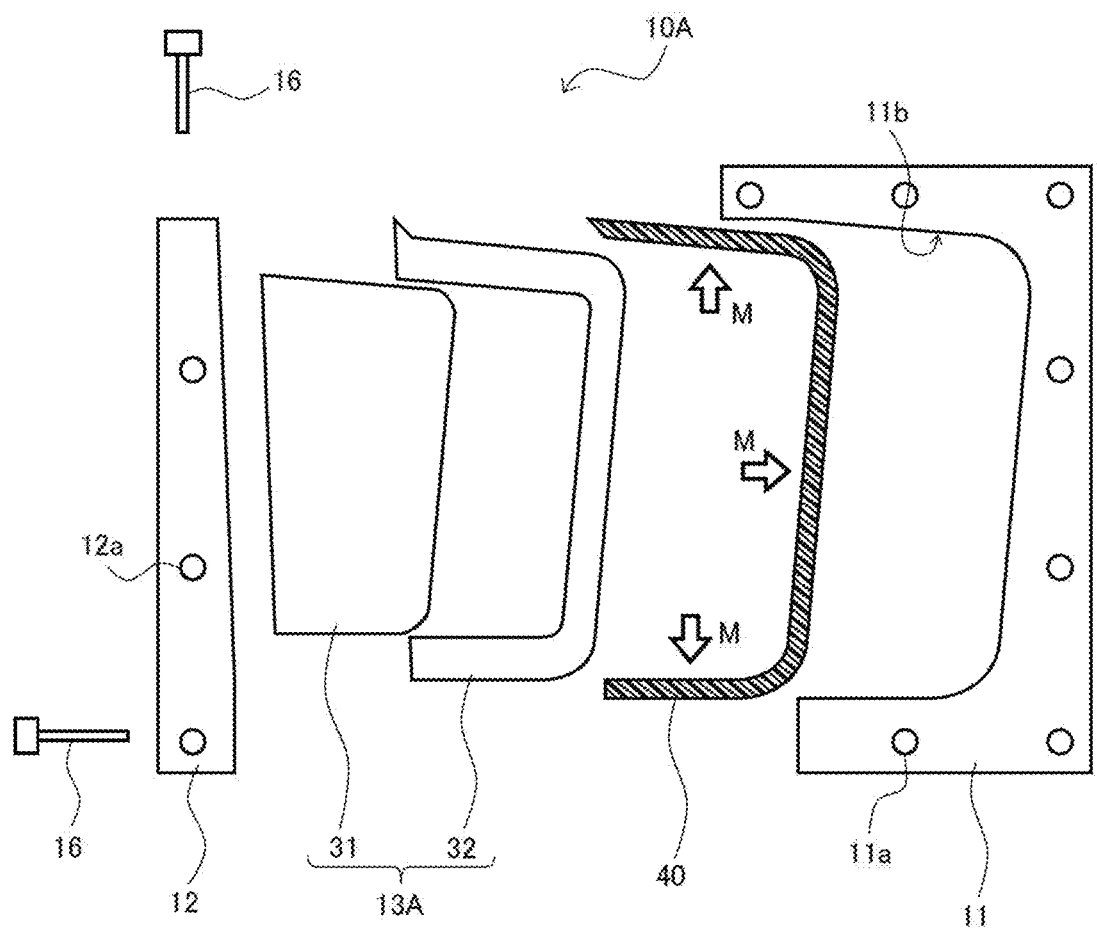
FIG. 4 is an exploded end surface view illustrating an example of a disposition relationship of a mold, a pressing body, and a laminate in the mold for manufacturing the composite material molded product illustrated in FIG. 2.

The female mold portion 11 has a cavity 11b as illustrated in FIG. 4, and the laminate 40 and the pressing body 13A are disposed in the cavity 11b. Therefore, the female mold portion 11 is provided with the cavity 11b which is a concave portion for which the pressing body 13A is a male mold. The side surface lid mold portion 12 is fixed to the female mold portion 11 so as to seal the cavity 11b in a state that the laminate 40 and the pressing body 13A are disposed in the cavity 11b of the female mold portion 11. If it is a general male-female pair mold, the side surface lid mold portion 12 is a "male mold portion" corresponding to the female mold portion 11, and a convex portion similar to the pressing body 13A is formed on the inner surface thereof. However, in the present disclosure, since the pressing body 13A is configured separately from the side surface lid mold portion 12, the side surface lid mold portion 12 functions as a "lid portion" that substantially hermetically seals the cavity 11b.

As illustrated in FIG. 3, the female mold portion 11 and the side surface lid mold portion 12 have an elongated shape extending along a longitudinal direction (axial member direction) of the laminate 40 to be the C-shaped molded material 20A. Therefore, looking only at the female mold portion 11, it is configured as a trench-shaped mold having the elongated cavity 11b, and the side surface lid mold portion 12 is configured as an elongated "lid member" in a flat-plate shape that closes this trench (the cavity 11b). Therefore, in the elongated cavity 11b of the female mold portion 11, the elongated laminate 40 and the elongated pressing body 13A are disposed, and an upper side surface (elongated opening) of the cavity 11b after they are disposed is sealed by the side surface lid mold portion 12. Note that this state will be referred to as a "basic assembled state" for the convenience of description.

Further, as illustrated in FIG. 3, in the mold 10A in the basic assembled state, both ends are open (only one end is illustrated in FIG. 3). Accordingly, the both ends are sealed by the end surface lid mold portion 14. Note that the state in which both the ends are sealed by the end surface lid mold portion 14 is referred to as a "final assembled state" for the convenience of description. Therefore, the end surface lid mold portion 14 also seals the cavity 11b in a state that the laminate 40 and the pressing body 13A are disposed in the cavity 11b of the female mold portion 11, similarly to the side surface lid mold portion 12.

The female mold portion 11, the side surface lid mold portion 12, and the end surface lid mold portion 14 are assembled so as to be fixed to each other by fastening members 16 as illustrated in FIGS. 2-4. Therefore, a plurality of fastening holes 11a, 12a, 14a into which the fastening members 16 are inserted are provided in the female mold portion 11, the side surface lid mold portion 12, and the end surface lid mold portion 14. For example, as illustrated in FIG. 2 and FIG. 4, a plurality of fastening holes 11a are provided in an end surface of the female mold portion 11, and a plurality of fastening holes 12a are also provided in an end surface of the side surface lid mold portion 12. Further, as illustrated in FIG. 3, a plurality of fastening holes 14a are also provided in the end surface lid mold portion 14.

In present Embodiment 1, bolts are used as the fastening members 16. The fastening holes 11a, 12a illustrated in FIG. 2 or FIG. 4 are holes for inserting a bolt tip to fix the end surface lid mold portion 14 to an end portion of the mold 10A (the female mold portion 11 and the side surface lid mold portion 12) in the basic assembled state. Therefore, it is sufficient that these fastening holes 11a, 12a are "thread groove holes" in which female thread grooves, on which male thread grooves at the bolt tips are screwed, are formed inside. Further, the fastening holes 14a provided in the end surface lid mold portion 14 in FIG. 3 may be any holes that can accommodate bolt heads so that the bolt heads are not exposed to an outer surface of the end surface lid mold portion 14, and may thus be formed as "counterbore holes", for example.

In FIGS. 2-4, a total of three fastening holes 12a are provided in the end surface of the side surface lid mold portion 12, and a total of seven fastening holes 11a are provided in the end surface of the female mold portion 11. Thus, when viewed as the end surface of the mold 10A in the basic assembled state, a total often thread groove holes are provided around the end surface. Therefore, a total of ten counterbore holes corresponding to these thread groove holes are provided in the end surface lid mold portion 14. In FIG. 3, the correspondences of two of the ten thread groove holes and counterbore holes are illustrated in an alternate long and short dash line.

In addition, a plurality of counterbore holes are also provided in an outer surface of the side surface lid mold portion 12, and the same number of corresponding thread groove holes are also provided in a side surface of the female mold portion 11. Therefore, in FIG. 2, the fastening members 16 for fixing the side surface lid mold portion 12 to the female mold portion 11 are illustrated by dotted lines. Furthermore, in the end surface of the mold 10A in the basic assembled state (the end surfaces of the female mold portion 11 and the side surface lid mold portion 12) and in a surface to which the side surface lid mold portion 12 is fixed in the side surface of the female mold portion 11 (the surface for sealing the cavity 11b), positioning holes for inserting a positioning pin may be formed.

When the female mold portion 11, the side surface lid mold portion 12, and the end surface lid mold portion 14 fixed to each other by the fastening members 16 are assumed as a "mold main body", the pressing body 13A is a member configured separately from the mold main body. The pressing body 13A has an outer surface shape corresponding to the pressed surface of the C-shaped molded material 20A (the composite material molded product), and is thermally expanded by heating. By this thermal expansion, the pressed surface of the C-shaped molded material 20A is pressed. Therefore, an inner surface of the mold main body has a shape corresponding to a shape other than the pressed surface of the C-shaped molded material 20A.

Note that, for the convenience of description, a surface of the pressing body 13A that presses the pressed surface of the C-shaped molded material 20A is referred to as a "pressure molding surface". The pressure molding surface has a shape corresponding to the shape of the pressed surface of the C-shaped molded material 20A. In present Embodiment 1, since the pressed surface of the C-shaped molded material 20A is the inner surface of the bent portion, the pressure molding surface of the pressing body 13A has an outer surface shape corresponding to the inner surface of the bent portion as described above. In the other embodiments described later, the pressure molding surface of the pressing body has a shape corresponding to the pressed surface of the composite material molded product (such as the C-shaped molded material 20A). Further, in other embodiments, as described above, the inner surface of the mold main body has a shape corresponding to the shape other than the pressed surface to be pressed by the pressing body 13A out of surfaces of the composite material molded product.

In present Embodiment 1, the cavity 11b of the female mold portion 11 has an inner surface shape corresponding to the shape of a major part other than the pressed surface. Furthermore, as illustrated in FIG. 2, the side surface lid mold portion 12 also includes a part of the inner surface shape corresponding to an edge surface of the one flange portion 22 of the C-shaped molded material 20A (a flat-edge surface not having the reverse cut portion 23. The lower side of the view of FIG. 2). In addition, although not clearly illustrated, as is clear from FIG. 3, the end surface lid mold portion 14 also includes a part of the inner surface shape corresponding to the flat both ends of the C-shaped molded material 20A. Therefore, the mold main body may be configured to include an inner surface shape corresponding to the shape other than the pressed surface.

In present Embodiment 1, as illustrated in FIGS. 2-4, the pressing body 13A is constituted of two members of an expansion core part 31 and a pressure distribution part 32. The expansion core part 31 functions as a core (center or main body) of pressing by thermal expansion in the pressing body 13A because of a relatively large thermal expansion coefficient. The pressure distribution part 32 has a thermal expansion coefficient smaller than that of the expansion core part 31 and is located on the pressed surface side as viewed from the expansion core part 31. At a time of thermal expansion, the expansion core part 31 has expansion force different in each portion thereof that is derived from a shape or the like thereof, and hence has pressing force that is also different. Since the pressure distribution part 32 has a small thermal expansion coefficient and has rigidity, it is possible to distribute and equalize the pressing force different for each portion by the expansion core part 31. Accordingly, the pressure distribution part 32 can favorably distribute the pressing force due to thermal expansion of the expansion core part 31 to the entire pressed surface, and when viewed as the entire pressing body 13A, the pressing force by the pressed surface can be entirely equal.

The specific configurations of the expansion core part 31 and the pressure distribution part 32 which constitute the pressing body 13A are not particularly limited. Further, the specific thermal expansion coefficient of each of the expansion core part 31 and the pressure distribution part 32, and the difference between these thermal expansion coefficients, and the like are not particularly limited. In present Embodiment 1, for example, silicone rubber, fluororubber (for example, vinylidene fluoride rubber (FKM), tetrafluoroethylene-propylene rubber (FEPM), tetrafluoroethylene-perfluorovinylether (FFKM), or the like) is used as the expansion core part 31. As the pressure distribution part 32, one made of polytetrafluoroethylene (PTFE) is used, but it is of course not limited thereto.

Further, in present Embodiment 1, as illustrated particularly in FIG. 4, the pressure distribution part 32 is located only at a site that abuts on a surface (indicated by a block arrow M in the view) of the laminate 40 to be a pressed surface in the pressing body 13A, but it is of course not limited to this. For example, from the viewpoint of adjusting the pressing force of the expansion core part 31, the pressure distribution part 32 may be provided so as to cover the entire outer surface of the expansion core part 31. In other words, the expansion core part 31 may be accommodated inside the pressure distribution part 32, so as to constitute the pressing body 13A. In addition, depending on the specific structure of the composite material molded product, and so on, the thickness of the pressure distribution part 32 (the thickness of a cross section from the expansion core part 31 to the pressed surface) may be different, or the pressure distribution part 32 may exist partially.

When the female mold portion 11, the side surface lid mold portion 12, and the end surface lid mold portion 14, which are the mold main body, are assembled with the fastening members 16, the laminate 40 and the pressing body 13A are disposed in the cavity 11b as described above. The laminate 40 is placed on the inner surface of the cavity 11b, and the pressing body 13A is placed on the laminate 40. As described above, by disposing the pressing body 13A in the cavity 11b of the mold main body, the molding space 15 (the region enclosed with a dotted line in FIG. 2 and FIG. 3) is formed between the inner surface of the cavity 11b and the outer surface of the pressing body 13A.

The laminate 40 is accommodated so as to be filled in the molding space 15. Further, since the cavity 11b of the female mold portion 11 is sealed by the side surface lid mold portion 12 and the end surface lid mold portion 14, the molding space 15 is also substantially hermetically sealed. When the mold 10A is heated in this state, the pressing body 13A thermally expands. Since the molding space 15 is substantially hermetically sealed, pressing force due to thermal expansion substantially does not leak to the outside, and presses the pressed surface of the laminate 40. Consequently, the laminate 40 is heat cured in a pressed state, and thus the laminate 40 can be molded into the C-shaped molded material 20A (composite material molded product) of a predetermined shape.

In addition, inside the mold 10A, the thermosetting resin (composition) is softened by heating and spreads over the entire molding space 15. Thus, together with the pressing force due to thermal expansion of the pressing body 13A, hydrostatic pressurization by the softened thermosetting resin also occurs. Therefore, in the obtained C-shaped molded material 20A, since favorable pressing force is generated in the entire molding space 15, it is possible to suppress occurrence of defects such as porosity accompanying insufficient pressing.

In addition, in the present disclosure, the mold 10A may have a configuration (for example, a vent portion or the like) for releasing gas or the like inside the mold 10A, that is, in the molding space 15 to the outside. Therefore, the mold 10A is not limited to the configuration in which the molding space 15 is completely hermetically sealed, and it is sufficient if the molding space 15 is configured to be substantially hermetically sealed as described above. Further, in the present disclosure, on mating surfaces of the mold parts (the female mold portion 11, the side surface lid mold portion 12, the end surface lid mold portion 14, and the like) constituting the mold main body of the mold 10A, a sealing material or the like may be provided to prevent or suppress the softened thermosetting resin from leaking to the outside.

[Method for Manufacturing Composite Material Molded Product]

Next, a method for manufacturing a composite material molded product according to the present disclosure will be specifically described with reference to FIG. 5A, FIG. 5B and FIG. 6A, FIG. 6B, taking the case of using the mold 10A of the above configuration as an example.

Figure 5A:
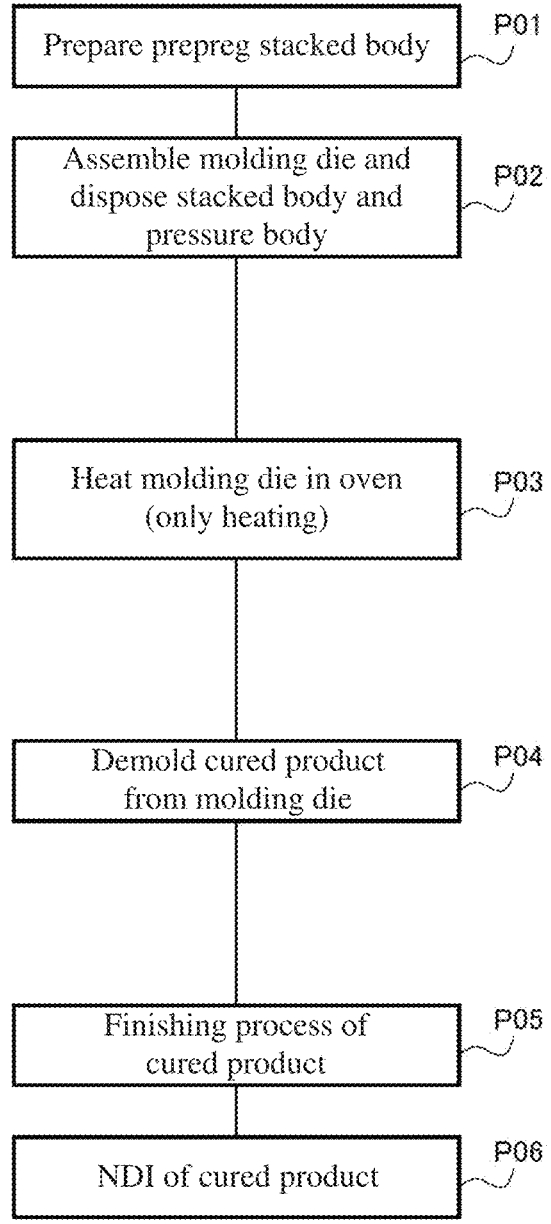
FIG. 5A is a schematic flow chart illustrating an example of a method for manufacturing a composite material molded product according to the present disclosure.
Figure 5B:
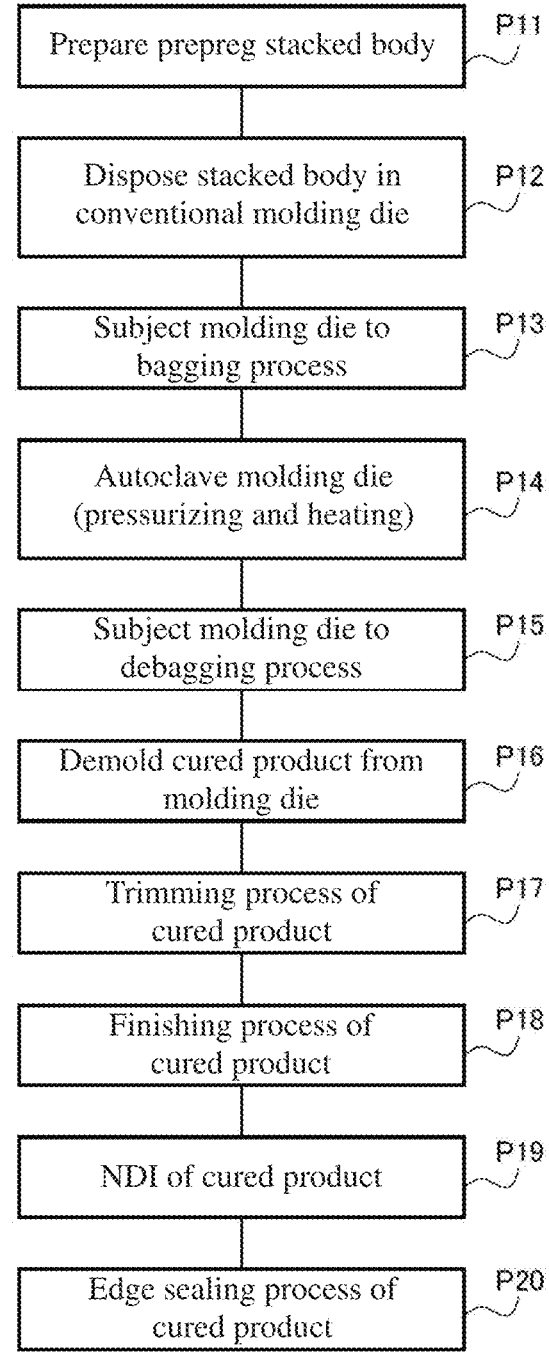
FIG. 5B is a schematic flow chart illustrating an example of a conventional method for manufacturing a composite material molded product.

The process chart illustrated in FIG. 5A illustrates a typical step when manufacturing a composite material molded product (C-shaped molded material 20A) using the mold 10A exemplified in FIGS. 2-4. On the other hand, the process chart illustrated in FIG. 5B illustrates a typical step when manufacturing a composite material molded product by a general manufacturing method using a conventional general mold (conventional mold). Although the steps to be performed differ depending on conditions such as the type, shape, and application of the composite material molded product, present Embodiment 1 exemplifies a manufacturing method in the case where the composite material molded product is an aircraft part.

When an aircraft part made of a composite material is manufactured by the conventional general manufacturing method, first, prepregs are stacked to prepare a laminate 40 (step P11), and this laminate 40 is disposed in a conventional mold (step P12). Thereafter, the conventional mold is subjected to a bagging process (step P13) using a heat-resistant film, a sealing material, and the like, and then autoclaved (step P14). The conventional mold (and the laminate 40) is pressurized and heated by the autoclave, and thus the laminate 40 is cured into a predetermined shape to be a cured product, that is, a composite material molded product.

When the autoclave is finished, the bagged conventional mold is taken out, this conventional mold is subjected to a debagging process (step P15), and thereafter the cured product (the composite material molded product) is demolded from the conventional mold (step P16). Here, in thermosetting in the autoclave, a matrix material (thermosetting resin) flows out and an excess portion which is cured is generated in the periphery. Therefore, the cured product is subjected to a trimming process to remove the excess portion (step P17).

After the trimming process, the cured product is subjected to a finishing process (step P18), and the cured product is subjected to non-destructive inspection (NDI) (step P19). In NDI, the presence or absence of defects affecting (or possible to affect) the quality of the cured product, such as delamination, voids (voids), and porosity, for example, is examined. Further, after NDI, the cured product is subjected to an edge sealing process to prevent moisture absorption from fibers exposed at a trim end by the trimming (step P20).

On the other hand, in the manufacturing method according to present Embodiment 1, in the same manner as in the prior art, prepregs are stacked to prepare a laminate 40 (step P01), and this laminate 40 is disposed in the mold 10A described above (step P02). That is, the laminate 40 is disposed on the inner surface of the cavity 11b of the female mold portion 11, and the pressing body 13A is disposed to overlap the laminate 40. As a result, since the laminate 40 and the pressing body 13A are disposed so as to fit inside the cavity 11b, and thus the side surface lid mold portion 12 and the end surface lid mold portion 14 are fixed to the female mold portion 11 by the fastening members 16, so as to seal the cavity 11b.

In the mold 10A assembled in this manner, the laminate 40 and the pressing body 13A are disposed in the cavity 11b. Therefore, the laminate 40 is accommodated so as to be filled in the molding space 15 formed between the inner surface of the cavity 11b and the outer surface of the pressing body 13A. In this state, the mold 10A is heated, for example, in an oven (step P03). As described above, since the cavity 11b is substantially hermetically sealed, the pressing force due to thermal expansion of the pressing body 13A is favorably applied to the pressed surface of the laminate 40.

Thus, in the manufacturing method according to the present disclosure, there is no need for an autoclave that performs pressurizing together with heating as in the conventional manufacturing method. Since the autoclave is relatively expensive compared to an oven or the like, the manufacturing method according to the present disclosure can suppress an increase in costs of manufacturing facilities. Further, when the autoclave is not required, the bagging process and the debagging process are no longer necessary. Since the number of steps and the operation time relatively increase in the bagging process and the debagging process, the manufacturing method can be made more efficient by reducing these processes.

When the laminate 40 is cured to obtain a cured product having a predetermined shape, that is, a composite material molded product, the mold 10A is disassembled to demold the cured product (step P04). Here, as described above, since the molding space 15 is substantially hermetically sealed, in the obtained cured product, although some burrs occur, an excess portion that requires trimming does not substantially occur. Therefore, the manufacturing method according to the present disclosure also eliminates the need for trimming. With respect to the demolded cured product, the cured product may be subjected to a finishing process (step P05), and the cured product may be subjected to NDI (step P06), as in the conventional case. In the manufacturing method according to the present disclosure, since the trimming is unnecessary, the edge sealing process is also unnecessary as in the conventional manufacturing method.

Here, differences between the composite material molded product obtained by the manufacturing method according to the present disclosure and the composite material molded product obtained by the conventional general manufacturing method will be specifically described focusing on the trimming in particular.

As described above, in the manufacturing method according to the present disclosure, after the pressing body 13A is disposed in the cavity 11b, the cavity 11b (that is, the molding space 15) is substantially hermetically sealed. Therefore, even if the mold 10A is heated without pressing from the outside, not only the laminate 40 can be favorably pressed by the pressing body 13A, but as described above, an excess portion is not generated in the composite material molded product.

For example, the C-shaped molded material 20A is modeled as illustrated in FIG. 6A, focusing on the base material (fiber material) and the matrix material (thermosetting resin). FIG. 6A is a model cross-sectional view in which the transverse section of the C-shaped molded material 20A is modeled. As apparent from this model cross sectional view, the base material 41 constituted of a fiber material extends across the entirety of the main body portion 21 and the pair of flange portions 22 (the entire transverse section of the C-shaped molded material 20A), and the matrix material 42 (thermosetting resin) completely covers the base material 41. Therefore, the fiber material which is the base material 41 is not exposed at a distal end surface 24.

On the other hand, the composite material molded product obtained by the conventional manufacturing method is also modeled similarly focusing on the base material 41 and the matrix material 42. As illustrated in FIG. 6B, in the model cross section of the conventional C-shaped molded material 120, the base material 41 extends across the entirety of the main body portion 121 and the pair of flange portions 122 (the entire transverse section of the conventional C-shaped molded material 120) as in the model cross section of the C-shaped molded material 20A illustrated in FIG. 6A, and the matrix material 42 (thermosetting resin) completely covers the base material 41. However, an excess portion 123 is generated at a distal end of the flange portion 122.

Since a root of the excess portion 123 is connected to the flange portion 122, the base material 41 is present therein, but the base material 41 is not present in a major part thereof. This is because the excess portion 123 is formed by the matrix material 42 flowing out when the conventional C-shaped molded material 120 is autoclaved. Accordingly, as illustrated by an alternate long and short dash line in FIG. 6B, when the excess portion 123 is cut by trimming, the base material 41 is exposed at a distal end surface 124 (trimmed end) of the flange portion 122. Therefore, in order to prevent moisture absorption from the exposed base material 41, as illustrated in FIG. 6B, an edge seal 125 is applied to the distal end surface 124.

Therefore, as compared with the conventional composite material molded product, the composite material molded product according to the present disclosure does not need to be trimmed because the excess portion 123 is not generated, and moreover, the base material 41 (fiber material) is not exposed on an end or the like thereof. Thus, it can be said that the base material 41 is in a state of being covered with the matrix material 42.

In present Embodiment 1, the C-shaped molded material 20A is exemplified as the composite material molded product as described above, but the composite material molded product to be manufactured in the present disclosure is of course not limited to the C-shaped molded material 20A. It is sufficient that the composite material molded product according to the present disclosure has a hollow transverse section or a cross-sectional shape including a bent portion or a curved portion. When the hollow, the bent portion, or the curved portion is present in the transverse section, a hollow side, an inside of the bent portion, or an inside of the curved portion can be a pressed surface when the laminate 40 is heat cured. Therefore, in the present disclosure, in the mold 10A, the pressing body 13A may be disposed in the cavity 11b so as to face the pressed surface.

Figure 7A:
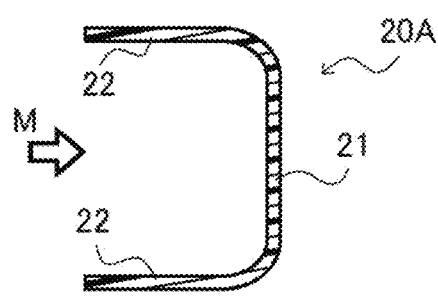
FIG. 7A-FIG. 7F are schematic cross-sectional views illustrating other examples of composite material molded products according to the present disclosure.

As the composite material molded product according to the present disclosure, products having various shapes can be mentioned, and are not particularly limited. As the aircraft part, for example, similarly to a C-shaped molded material 20A illustrated in FIG. 7A (see FIG. 1A-FIG. 1C), a molded material which extends in a material axial direction and has a predetermined cross-sectional shape can be mentioned. Such a molded material is used as, for example, a stringer or a stiffener such as a frame for aircraft. The specific shape of the molded material is not particularly limited, and examples include, other than the C-shaped molded material 20A, a J-shaped molded material 20B illustrated in FIG. 7B, an H-shaped molded material 20C illustrated in FIG. 7C, an L-shaped molded material 20D illustrated in FIG. 7D, a T-shaped molded material, a hat-shaped (or a-shaped) material, and the like.

As illustrated in FIG. 7A-FIG. 7D, these molded materials are each configured to have a plate-shaped main body portion 21 (*web*) and a flange portion 22 provided on at least one of edges of the main body portion 21, and a cross section thereof has a shape in which at least one flange portion 22 is bent from the main body portion 21. In the C-shaped molded material 20A illustrated in FIG. 7A (see also FIG. 1A-FIG. 1C), as described above, a pair of flange portions 22 and a main body portion 21 form a bent portion, and thus inner surfaces of the flange portions 22 and an inner surface of the main body portion 21 serve as a pressed surface.

Figure 7B:
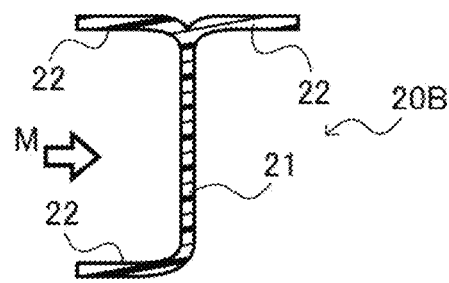
Figure 7C:
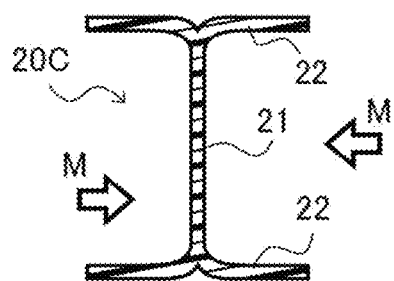

The J-shaped molded material 20B illustrated in FIG. 7B has three flange portions 22. Among them, a pair of flange portions 22 positioned in the same direction and a main body portion 21 form a bent portion. Since the bent portion is substantially the same as the bent portion of the C-shaped molded material 20A, it will be referred to as a "C-shaped bent portion" for convenience. The H-shaped molded material 20C illustrated in FIG. 7C has two pairs of flange portions 22, and the total number of flange portions 22 is four. Therefore, the H-shaped molded material 20C has two C-shaped bent portions. In both of the J-shaped molded material 20B and the H-shaped molded material 20C, inner surfaces of the pair of flange portions 22 and inner surfaces of the main body portion 21 serve as pressed surfaces.

Figure 7D:
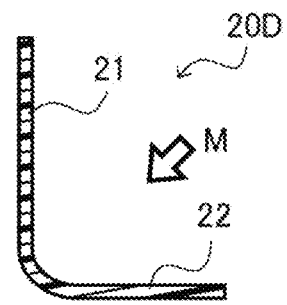

Moreover, as illustrated in FIG. 7D, also in the L-shaped molded material 20D which has only one flange portion 22, it can be considered that the bent portion is formed by the main body portion 21 and one flange portion 22. Therefore, when a surface on the flange portion 22 side in the main body portion 21 is an inner surface, and a surface on the main body portion 21 side in the flange portion 22 is an inner surface, inner surfaces of the main body portion 21 and the flange portion 22 are a pressed surface also in the L-shaped molded material 20D. Note that the bent portion of the L-shaped molded material 20D is referred to as an "L-shaped bent portion" for convenience.

Here, the J-shaped molded material 20B illustrated in FIG. 7B has a C-shaped bent portion and an L-shaped bent portion, but in present Embodiment 1, the pressed surface is set while focusing only on the C-shaped bent portion. This is because not only pressing due to thermal expansion of the pressing body but also hydrostatic pressurization by softening of the thermosetting resin (composition) and spreading across the entire molding space 15 occurs as described above. Therefore, as will be described in Embodiment 3 described later, it is possible to press a single flange portion 22 constituting an L-shaped bent portion simply by disposing the pressing body with the C-shaped bent portion as the pressed surface. Of course, on the J-shaped molded material 20B, a pressing body may be disposed with the inner surface of the L-shaped bent portion being the pressed surface.

Furthermore, even when the flange portion 22 is not clearly bent from the main body portion 21 as in the L-shaped molded material 20D illustrated in FIG. 7D, a composite material molded product is conceivable in which the transverse section of the main body portion 21 is curved. In such a composite material molded product, the inner surface of the curved portion may be a pressed surface.

As described above, the pressed surface indicated by block arrows M in FIG. 7A-FIG. 7D is the inner surface of the main body portion 21 and the flange portion 22 constituting the bent portion, regardless of the cross-sectional shape of the composite material molded product. The pressing body 13A may be formed to have an outer surface corresponding to these pressed surfaces, and may be disposed in the cavity 11*b* of the mold 10A so as to abut on the pressed surface.

Figure 7E:
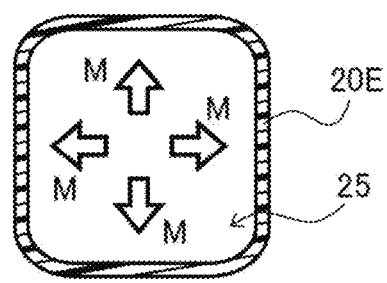
Figure 7F:
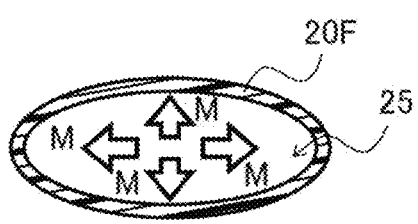

In addition, the composite material molded product may be a hollow material 20E illustrated in FIG. 7E or a hollow material 20F illustrated in FIG. 7F. The hollow material 20E has a substantially rectangular cross-sectional shape and an inside thereof is a hollow portion 25, and the hollow material 20F has a substantially elliptical cross-sectional shape and an inside thereof is a hollow portion 25. The pressed surface indicated by block arrows M is the inner surface of the hollow portion 25, and the pressing body 13A may be formed in a shape corresponding to the hollow portion 25.

Further, the hollow materials 20E, 20F may be one extending in the material axial direction and having a predetermined cross-sectional shape similarly to the molded material, and may be configured to partially have a hollow portion 25. For example, among helicopter blades, there exists a type in which a rotor hub is inserted in and fixed to a proximal end thereof. In this type of blade, the proximal end will have a hollow portion 25. Therefore, the mold 10A according to the present disclosure or the manufacturing method according to the present disclosure can be preferably applied also when such a helicopter blade is manufactured as a composite material molded product.

MODIFICATION EXAMPLE

Figure 8:
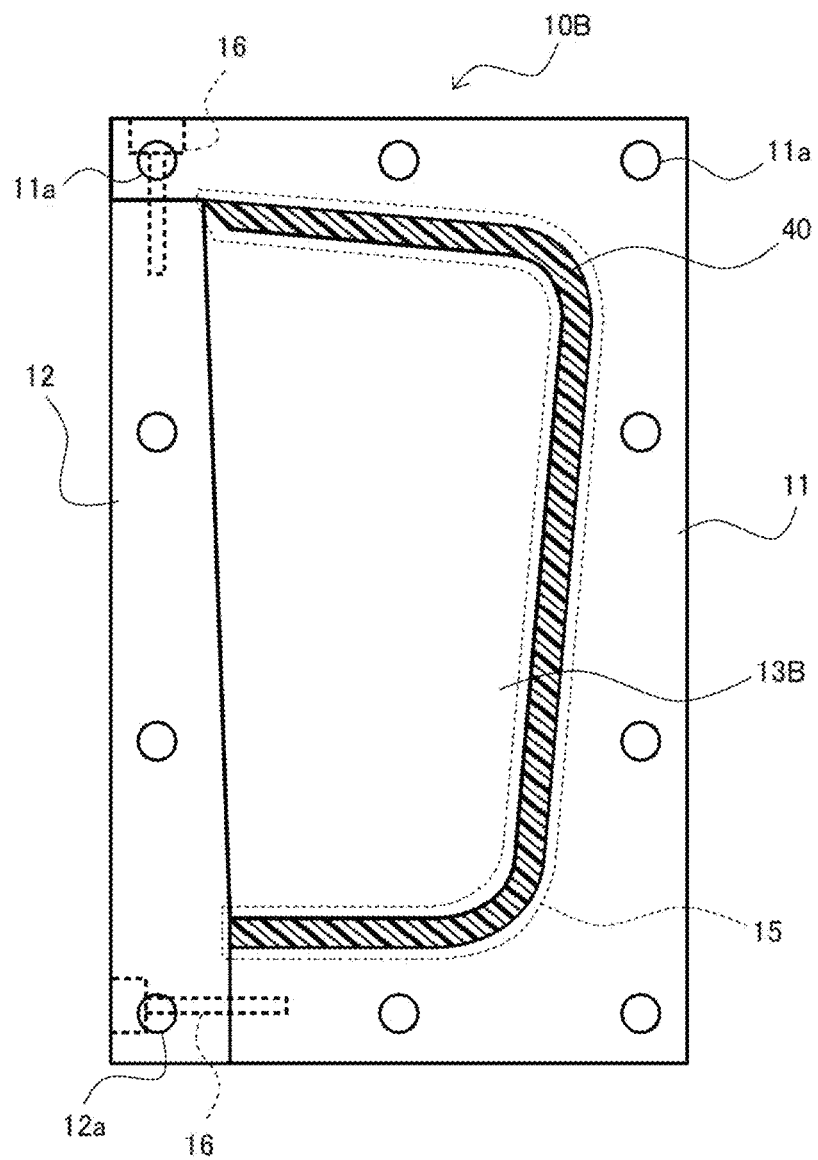
FIG. 8 is a schematic end surface view illustrating a modification example of the mold for manufacturing the composite material molded product illustrated in FIG. 2.

In present Embodiment 1, the pressing body 13A is not particularly limited as long as it has an outer surface shape (pressure molding surface) corresponding to the shape of the pressed surface of the composite material molded product and thermally expands. In the configuration illustrated in FIGS. 2-4 described above, the pressing body 13A is formed of a plurality of members having different thermal expansion coefficients, and the pressure distribution part 32 has a small thermal expansion coefficient relative to the expansion core part 31 to be a main part of thermal expansion. However, the present disclosure is not limited thereto. For example, although the mold 10B illustrated in FIG. 8 basically has the same configuration as the mold 10A illustrated in FIGS. 2-4, the pressing body 13B is configured as a single thermal expansion member.

Depending on various conditions such as the structure of the composite material molded product, the composition of the thermosetting resin composition, and curing conditions of the thermosetting resin (composition), it may be necessary to adjust pressing force applied to the pressed surface. For example, when it is desired to distribute the pressing force more favorably, as illustrated in FIGS. 2-4, it is sufficient to use the pressing body 13A formed by the expansion core part 31 and the pressure distribution part 32. However, as long as sufficient pressing force can be applied to the pressed surface, a single member can be used similarly to a pressing body 13B illustrated in FIG. 8.

Figure 9:
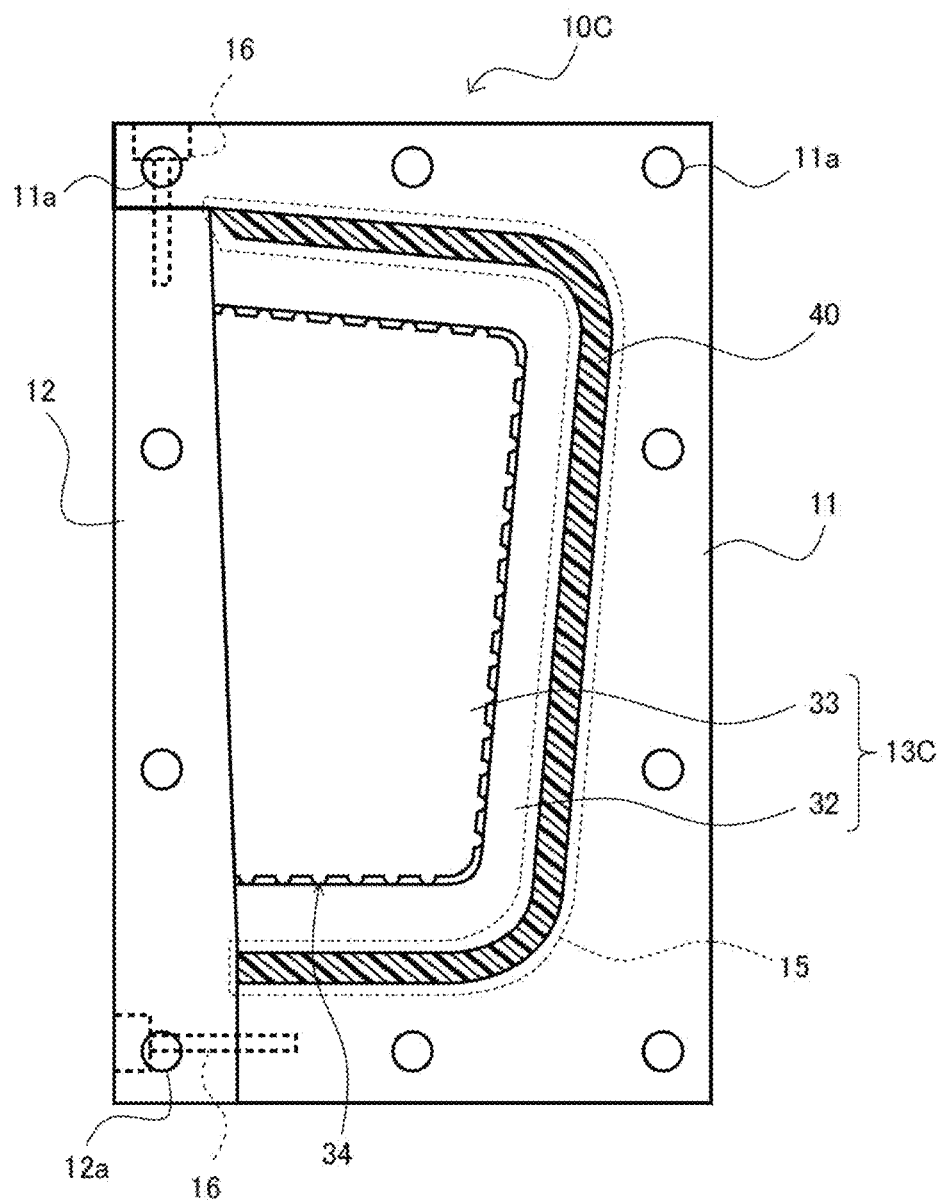
FIG. 9 is a schematic end surface view illustrating another modification example of the mold for manufacturing the composite material molded product illustrated in FIG. 2.

In addition, when it is desired to distribute the pressed surface more favorably, a concavo-convex structure that adjusts pressing force due to thermal expansion may be provided on the outer surface of the pressing body or a surface of one of a plurality of members constituting the pressing body. Specifically, for example, a mold 10C illustrated in FIG. 9 is basically constituted of an expansion core part 33 and a pressure distribution part 32 similarly to the mold 10A illustrated in FIGS. 2-4, and a plurality of convex portions 34 are formed on an entire outer surface of the expansion core part 33. In other words, the pressed surface of the expansion core part 33 is dimpled.

By forming the plurality of convex portions 34 in the expansion core part 33, pressing force for the pressure distribution part 32 of the expansion core part 33 can be favorably adjusted. Therefore, the pressing force of the expansion core part 33 can be favorably transmitted to the pressure distribution part 32, and the pressed surface of the laminate 40 can be favorably pressed via the pressure distribution part 32. Note that the concavo-convex structure that adjusts the pressing force is not limited to the plurality of convex portions 34. For example, the concavo-convex structure may be dimpling such that a plurality of concave portions are formed instead of the plurality of convex portions 34.

Further, the shape of the plurality of convex portions 34 viewed from a processed surface may be a circular shape, but the shape of the convex portions 34 is not limited to this, and may be an oval, a triangle, a rectangle, a polygon, or the like. Furthermore, the concavo-convex structure may be concavities and convexities in other geometric shapes other than the convex portions 34 or the concave portions. Although these concavo-convex structures may be of only one type like the plurality of circular convex portions 34, multiple types of concavo-convex structures may be mixed.

Further, in the mold 10C illustrated in FIG. 9, the plurality of convex portions 34 that is the concavo-convex structure are formed on the entire outer surface of the expansion core part 33, but the formation position of the concavo-convex structure is not limited thereto. For example, the concavo-convex structure may be formed on both the outer surface of the expansion core part 33 and the outer surface of the pressure distribution part 32, or may be formed only on the outer surface of the pressure distribution part 32, or may be formed on the inner surface of the pressure distribution part 32 (the surface that abuts on the outer surface of the expansion core part 33), or the concavo-convex structure may be formed on part of the outer surface or the inner surface instead of the entire surface.

The configuration for adjusting the pressing force is not limited to the configuration in which the outer surface of the pressing body or a member constituting the pressing body is provided with the concavo-convex structure, and may be a configuration in which a hollow box part is provided inside the pressing body or the member constituting the pressing body. Specifically, for example, a mold 10D illustrated in FIG. 10 basically has a similar configuration to the mold 10C illustrated in FIG. 9, and a pressing body 13D includes an expansion core part 33 in which a plurality of convex portions 34 are formed on an outer surface and a pressure distribution part 32. Further, a hollow box part 35 which is deformable inward accompanying thermal expansion of the expansion core part 33 is positioned inside the expansion core part 33. Therefore, the pressing body 13D includes the expansion core part 33, the pressure distribution part 32, and the hollow box part 35.

Figure 10:
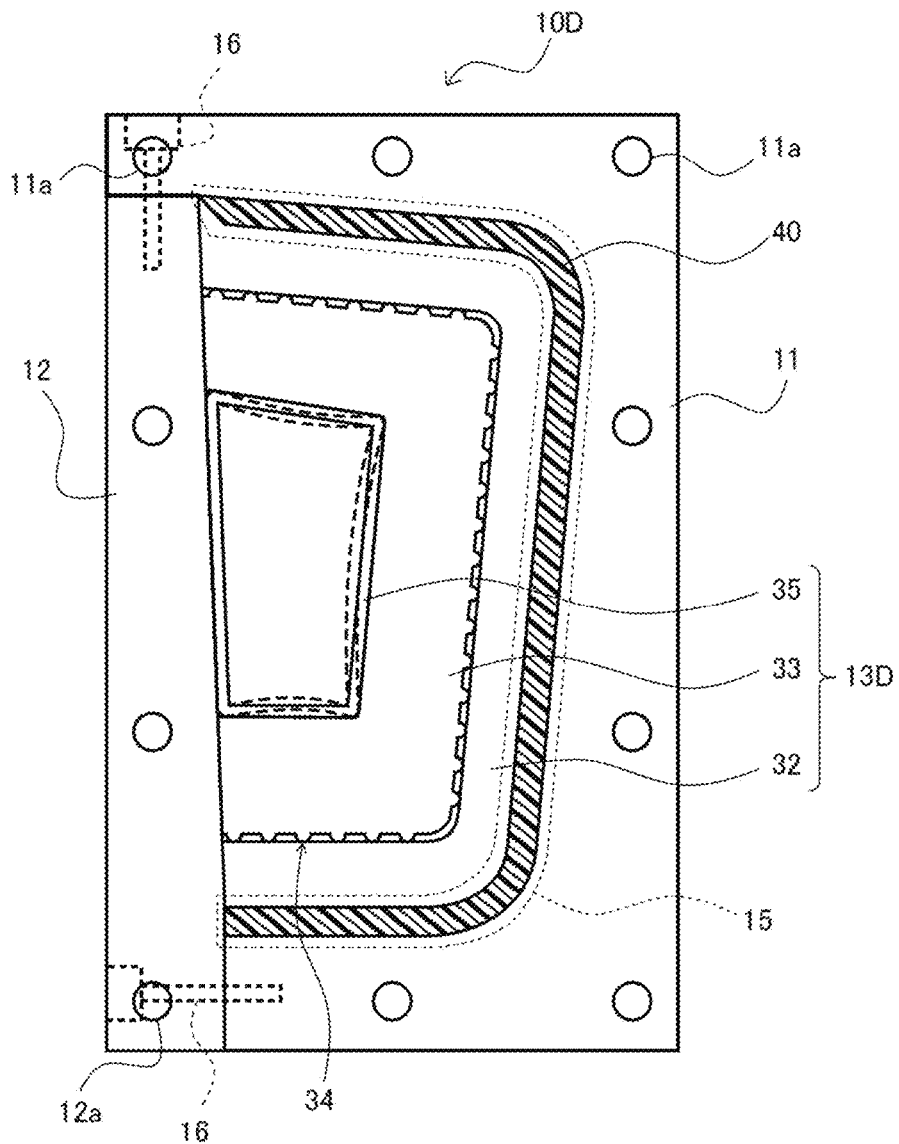
FIG. 10 is a schematic end surface view illustrating still another modification example of the mold for manufacturing the composite material molded product illustrated in FIG. 2.

The hollow box part 35 may be configured to be crushed so as to be deformed inward by thermal expansion of the expansion core part 33 as schematically illustrated by a dashed line in FIG. 10, and to return to the original shape when thermal curing is completed and the thermal expansion converges. Therefore, the specific configuration of the hollow box part 35 is not particularly limited, and may be any box body that can be crushed by receiving pressing force generated by thermal expansion of the expansion core part 33 (or the pressing body 13D).

The material of the hollow box part 35 is not particularly limited, and may be any material that has heat resistance of being capable of withstanding the temperatures during heat curing. Typically, metals such as aluminum or alloys thereof can be mentioned, and they may be made of a heat resistant resin or a composite material. Shape retentivity (pressure resistance) of the hollow box part 35 against pressing force is also not particularly limited, and a plate thickness may be adjusted or an internal structure may be designed so as to be crushed when the pressing force generated during heat curing exceeds a predetermined range.

Note that in the configuration illustrated in FIG. 10, the pressing body 13D included in the mold 10D is provided with the plurality of convex portions 34 on the outer surface of the expansion core part 33, and then with the hollow box part 35 inside the expansion core part 33, but the present disclosure is not limited to such a configuration. For example, it may be a configuration in which the hollow box part 35 is applied to the mold 10A illustrated in FIG. 2 and the pressing body 13A included therein, that is, a configuration in which the hollow box part 35 is provided inside the expansion core part 31 having no concavo-convex structure such as the plurality of convex portions 34 on the outer surface. Alternatively, it may be a configuration in which the hollow box part 35 is applied to the mold 10B illustrated in FIG. 8 and the pressing body 13B included therein, that is, a configuration in which the hollow box part 35 is provided inside the pressing body 13B constituted of a single thermal expansion member.

As described above, in the molds 10A-10D according to the present disclosure, the mold main body (the female mold portion 11, the side surface lid mold portion 12, and the end surface lid mold portion 14) which is a matched die is heated, so as to heat the pressing bodies 13A-13D disposed in the cavity 11b. In this manner, the pressing bodies 13A-13D expand and press the pressed surface of the laminate 40 in the molding space 15. Thus, in the composite material molded product having a hollow, a bent portion, or a curved portion, not only the outer surface but also the inner surface (pressed surface) can be formed into a desired shape.

Further, since the pressing bodies 13A-13D thermally expand inside the mold main body and press the laminate 40, it is not necessary to perform heating accompanied by pressurization as in an autoclave, and the composite material molded product can be molded into a predetermined shape only by a general heating device such as an oven. Moreover, since the cavity 11b can be sealed in a state in which the laminate 40 is accommodated, it is not necessary to bag the molds 10A-10D before heating and to debag the molds 10A-10D after heating. As a result, the manufacturing processes of the composite material molded product can be simplified.

Furthermore, the laminate 40 is accommodated in the molding space 15 closed in the cavity 11b, and is heat cured while being entirely pressed by thermal expansion of the pressing bodies 13A-13D. Therefore, in the obtained composite material molded product, the cured product of the thermosetting resin composition hardly leaks out of the cavity 11b at an end thereof. At this time, the thermosetting resin (composition) is softened by heating and spreads throughout the molding space 15. Consequently, in addition to the pressing force due to thermal expansion of the pressing bodies 13A-13D, hydrostatic pressurization by the softened thermosetting resin also occurs. Therefore, since more favorable pressing force is generated in the entire molding space 15, it is possible to effectively suppress occurrence of defects such as porosity accompanying insufficient pressing in the obtained composite material molded product.

Further, since the thermosetting resin (composition) hardly leaks from the molding space 15, in the obtained composite material molded product, favorable molding to the end can be performed. Therefore, it is not necessary to form the excess portion 123 in the composite material molded product. Accordingly, the trimming operation becomes unnecessary on the obtained composite material molded product, and since the trimming operation is not necessary, it is possible to avoid exposure of fibers (base material 41) generated at a trimmed end. Thus, for example, it is not necessary to apply an edge seal to an end of the composite material molded product to prevent moisture absorption. As a result, the manufacturing processes can be further simplified.

In addition, since the laminate 40 is pressed using the pressing bodies 13A-13D, it is not necessary to press the molds 10A-10D even though they are matched dies. Moreover, by adjusting the sizes or shapes of the molds 10A-10D and the pressing bodies 13A-13D, composite material molded products of various sizes or shapes can be manufactured, and favorable pressure can be applied in all directions from the pressing bodies 13A-13D to the pressed surface of the laminate 40. Thus, molding of a complex shape is also possible.

Embodiment 2

In the molds 10A-10D according to above Embodiment 1, the laminate 40 is heat cured using, for example, an external heating device such as an oven after the mold main body is assembled. On the other hand, in present Embodiment 2, the mold main body has a configuration including heating parts for heating the mold main body. Such a mold will be specifically described with reference to FIG. 11.

Figure 11:
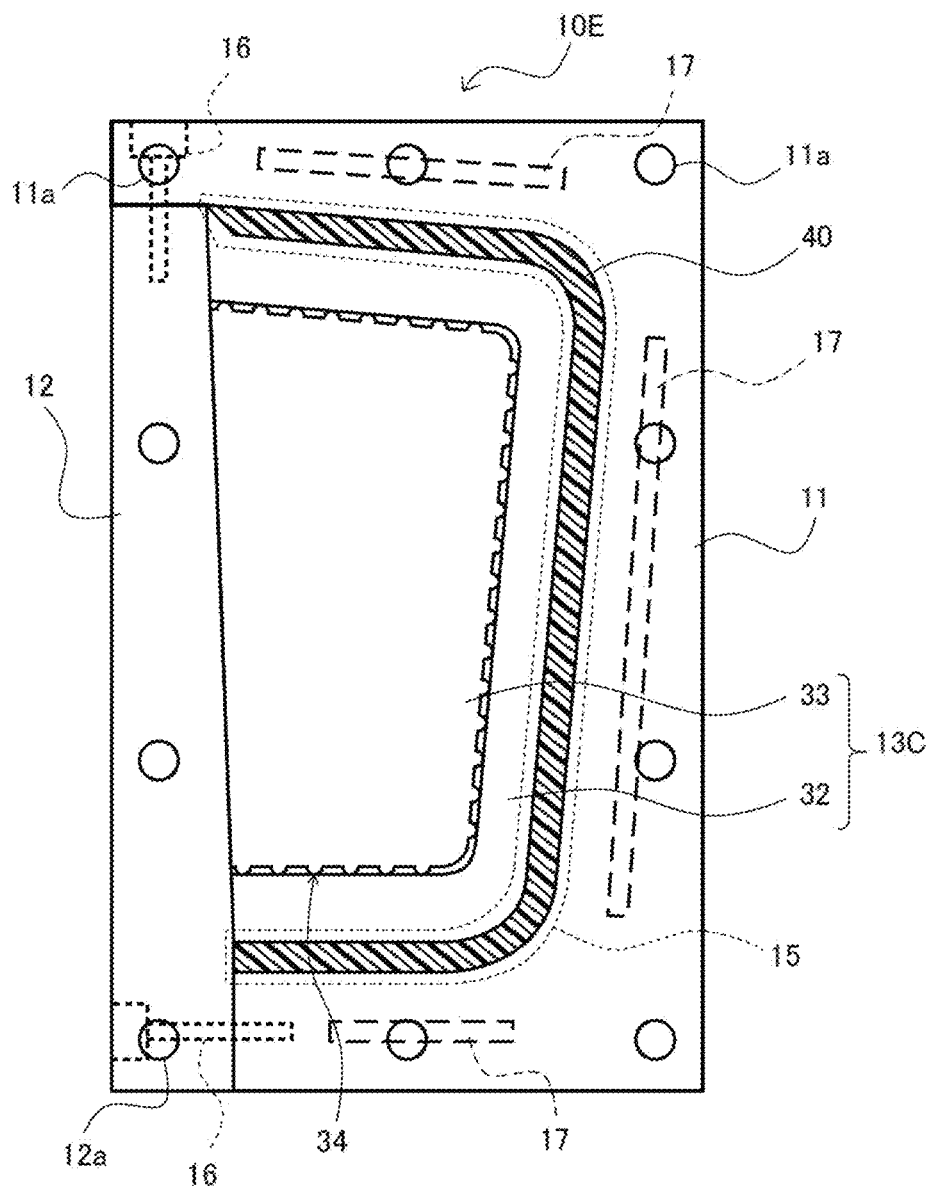
FIG. 11 is a schematic end surface view illustrating an example of a mold for manufacturing a composite material molded product according to Embodiment 2 of the present disclosure.

As illustrated in FIG. 11, a mold 10E according to present Embodiment 2 has the same configuration as the mold 10C out of the molds 10A-10D according to above Embodiment 1. Specifically, the mold 10E includes a female mold portion 11, a side surface lid mold portion 12, and an end surface lid mold portion 14, which are the mold main body, and also includes a pressing body 13C. The pressing body 13C is constituted of an expansion core part 33 having a plurality of convex portions 34 and a pressure distribution part 32. Furthermore, the female mold portion 11 includes a plurality of heating parts 17 in an inside thereof.

In the configuration illustrated in FIG. 11, the heating parts 17 are provided on three sides out of four side surfaces of the female mold portion 11 except the surface to which the side surface lid mold portion 12 is fixed (the surface where the cavity 11b is opened). In addition, in FIG. 11, since the heating parts 17 are not exposed on end surfaces, they are illustrated with broken lines. The specific configurations of the heating parts 17 are not limited, and any mold heater known in the field of molding of a composite material molded product or in the field of molding of other resin materials can be used. The mold heater may be of a type incorporated in a mold 10E as illustrated in FIG. 11 or of a type attached to the outside of the mold 10E.

The female mold portion 11, the side surface lid mold portion 12, and the end surface lid mold portion 14 are assembled with fastening members 16. At the time of this assembly, first, a laminate 40 is disposed in the cavity 11b of the female mold portion 11, the pressing body 13C is disposed, and thereafter, the side surface lid mold portion 12 is fixed to the female mold portion 11 with the fastening members 16, so as to seal the cavity 11b (basic assembled state). Thereafter, the end surface lid mold portion 14 is fixed by the fastening members 16 so as to seal both ends of the mold 10E in the basic assembled state (final assembled state).

Thereafter, in present Embodiment 2, the heating parts 17 are operated to heat the mold 10E itself, instead of placing and heating the mold 10E in an oven as in above Embodiment 1. Thus, a composite material molded product, such as the C-shaped molded material 20A, can be manufactured, without introducing an oven as manufacturing equipment.

As described above, present Embodiment 2 uses the mold 10E including the mold main body, which is a matched die, and the pressing body 13C, and the heating parts 17 are provided in the mold main body. Then, after the laminate 40 is disposed in the cavity 11b, the pressing body 13C is disposed, the mold main body is assembled so as to seal the cavity 11b, and the mold 10E is heated by the heating parts 17 without using an external heating device. By heating the mold 10E itself without pressing from the outside in this manner, the pressing body 13C can be thermally expanded and the laminate 40 can be favorably pressed. Thus, the composite material molded product can be manufactured without introducing manufacturing equipment such as an autoclave or an oven.

Embodiment 3

The molds 10A-10E described in above Embodiment 1 or 2 are all configured to manufacture the C-shaped molded material 20A as a composite material molded product, but in present Embodiment 3, for example, a J-shaped molded material 20B (see FIG. 7B) will be taken as another composite material molded product, and a mold configured to manufacture this J-shaped molded material 20B will be specifically described with reference to FIGS. 12-13.

Figure 12:
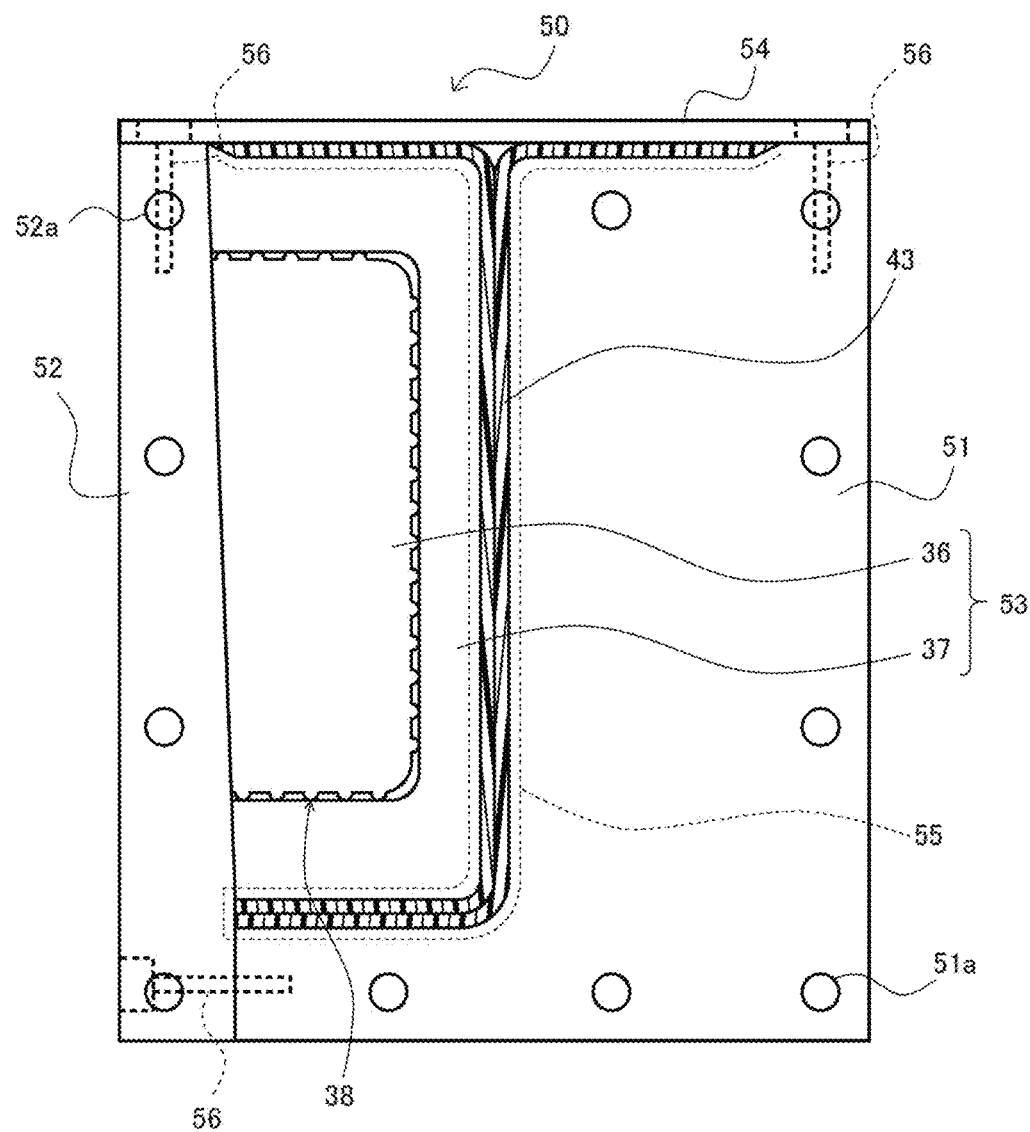
FIG. 12 is a schematic end surface view illustrating an example of a mold for manufacturing a composite material molded product according to Embodiment 3 of the present disclosure.

As illustrated in FIG. 12, the mold 50 according to present Embodiment 3 includes a female mold portion 51, a side surface lid mold portion 52, an end surface lid mold portion, a caul plate 54, and a pressing body 53. Among them, the female mold portion 51, the side surface lid mold portion 52, the end surface lid mold portion, and the caul plate 54 are the mold main body. Similarly to the modification example of above Embodiment 1 or one exemplified in above Embodiment 2, the pressing body 53 is constituted of an expansion core part 36 having a plurality of convex portions 38 formed on a surface thereof, and a pressure distribution part 37. Moreover, a laminate 43 accommodated in a molding space 55 (the region enclosed with a dotted line in FIG. 12) of the mold 50 becomes a J-shaped molded material 20B (see FIG. 7B) by heat curing.

The side surface lid mold portion 52 and the end surface lid mold portion are, similarly to the side surface lid mold portion 12 and the end surface lid mold portion 14 in Embodiment 1 or 2, lid mold portions for sealing the cavity of the female mold portion 51, and the caul plate 54 also functions as a lid mold portion for sealing the cavity of the female mold portion 51. The specific configuration of the caul plate 54 is not particularly limited, and a caul plate known in the field of manufacturing composite material molded products (for example, one used in an autoclave) can be preferably used.

Similarly to the female mold portion 11 in Embodiment 1 or 2, a plurality of fastening holes 51a are provided in an end surface of the female mold portion 51. Similarly, a plurality of fastening holes 52a are provided in an end surface of the side surface lid mold portion 52, similarly to the side surface lid mold portion 12 in Embodiment 1 or 2. A plurality of fastening holes are also provided in the end surface lid mold portion. The female mold portion 51, the side surface lid mold portion 52, the end surface lid mold portion, and the caul plate 54, which are the mold main body, are assembled by fixing to each other with fastening members 56 (for example, bolts) or the like as in Embodiment 1 or 2.

Figure 13:
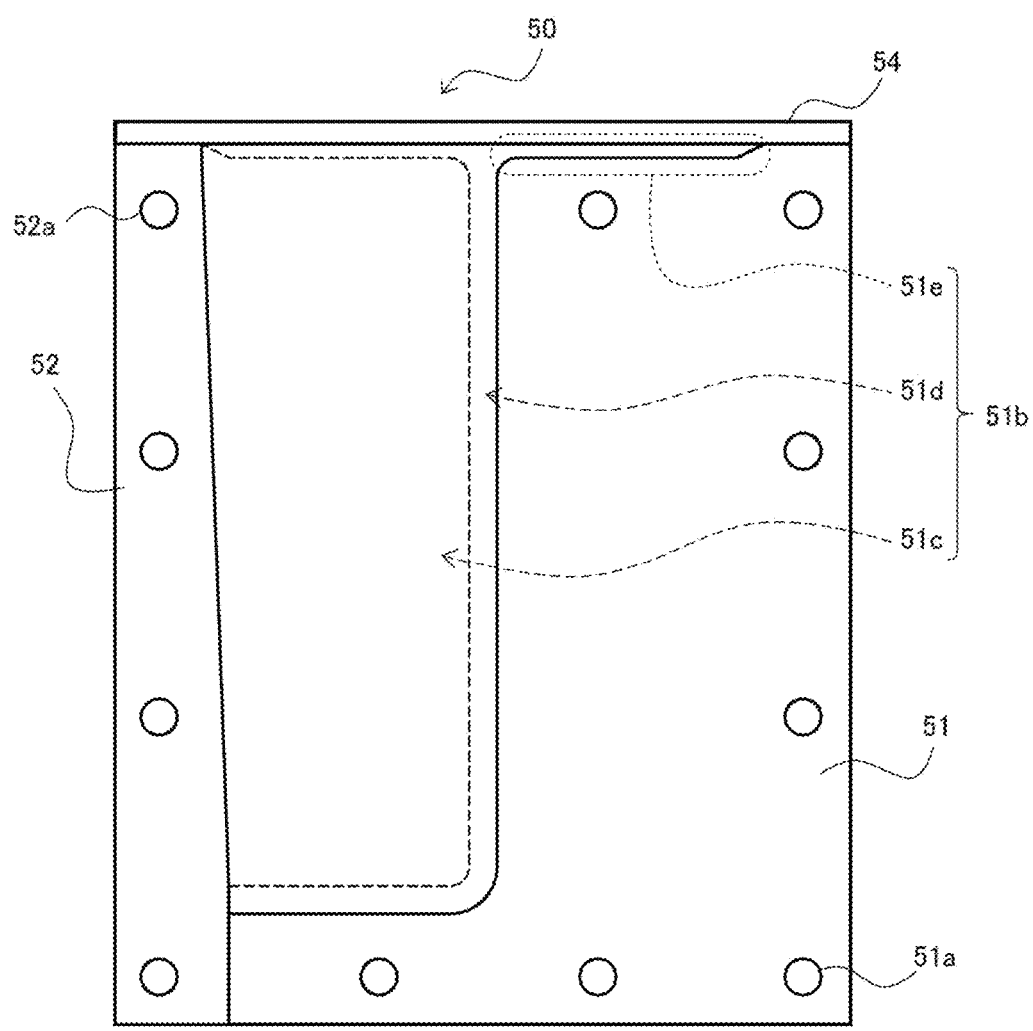
FIG. 13 is a schematic end surface view describing a cavity in the mold for manufacturing the composite material molded product illustrated in FIG. 12.

As illustrated in FIG. 13, in the female mold portion 51, a cavity 51b is provided similarly to the female mold portion 11 in Embodiment 1 or 2. The cavity 51b can accommodate the laminate 43 and the pressing body 53 therein similarly to the cavity 11b of the female mold portion 11, and includes an inner surface shape corresponding to a shape other than a pressed surface of the J-shaped molded material 20B (see FIG. 7B). As illustrated in FIG. 12, in a state that the mold 50 is assembled, the laminate 43 is accommodated in the molding space 55 formed between the inner surface of the cavity 51b and the outer surface of the pressing body 53.

Here, in present Embodiment 3, as illustrated in FIG. 13, the cavity 51b can be divided into a pressing body region 51c, a first molding space region 51d, and a second molding space region 51e. The pressing body region 51c is a region of the cavity 51b in which the pressing body 53 is disposed, and occupies a major part of the cavity 51b. The first molding space region 51d and the second molding space region 51e are regions corresponding to the molding space 55, and are regions in which the laminate 43 is disposed.

Among them, the first molding space region 51d is a region adjacent to and surrounding the pressing body region 51c. In other words, the pressing body 53 disposed in the pressing body region 51c abuts on the pressed surface of the laminate 43 disposed in the first molding space region 51d. Therefore, in present Embodiment 3, the pressing body 53 has a pressure molding surface corresponding to the pressed surface of the J-shaped molded material 20B (laminate 43).

The J-shaped molded material 20B obtained by heat curing the laminate 43 has a main body portion 21 and three flange portions 22 (see FIG. 7B). Among them, two flange portions 22 are located in the same direction, and the other one is located in the opposite direction of the two flange portions 22. For the convenience of description, when the pair of flange portions 22 located in the same direction is referred to as "first and second flange portions 22" and the flange portion 22 located in the opposite direction is referred to as a "third flange portion 22", the pressed surface of the laminate 43 corresponds to the portion between the main body portion 21 and the first and second flange portions 22 in the J-shaped molded material 20B. The second molding space region 51e is adjacent only to the first molding space region 51d. In the second molding space region 51e, a portion of the laminate 43 corresponding to the third flange portion 22 of the J-shaped molded material 20B is accommodated.

As illustrated in FIG. 13, in the female mold portion 51, when a side surface on which the pressing body 53 is disposed is a first side surface (a left side surface in the view of FIG. 13), a side surface opposite to the first side surface is a second side surface (a right side surface in the view of FIG. 13), and a pair of side surfaces existing between the first side surface and the second side surface are a third side surface (an upper side surface in the view) and a fourth side surface (a lower side surface in the view), respectively, side surfaces where the cavity 51b is located are the first side surface and the third side surface. The side surface lid mold portion 52 is fixed to the first side surface so as to seal the cavity 51b, and the caul plate 54 is fixed to the third side surface so as to seal the cavity 51b.

Here, the pressing body region 51c (and a part of the first molding space region 51d corresponding to a distal end of the flange portion 22) of the cavity 51b is located on the first side surface, and the first molding space region 51d and the second molding space region 51e of the cavity 51b are located on the third side surface. As described above, although the pressing body region 51c and the first molding space region 51d are adjacent and can be regarded as a substantially single area, the second molding space region 51e is an elongated region branching from the single area (a region corresponding to the third flange portion 22). The second molding space region 51e is a region located between the female mold portion 51 and the caul plate 54, in which the pressing body 53 is not disposed.

In present Embodiment 3, the pressing body 53 is expanded by heating the mold 50, and presses the pressed surface of the laminate 43. At this time, a portion corresponding to the main body portion 21 and the first and second flange portions 22 of the J-shaped molded material 20B is directly pressed from the pressed surface, but the pressing body 53 does not abut on a portion corresponding to the third flange portion 22 (the second molding space region 51e), and this portion is merely sandwiched between the female mold portion 51 and the caul plate 54. However, in addition to the pressing force from the pressing body 53, as described above, since hydrostatic pressurization is possible because the thermosetting resin (composition) is softened and spreads over the entire molding space 15, the laminate 43 is sufficiently pressed also in the second molding space region 51e where the pressing body 53 is not positioned.

Thus, in the present disclosure, the cavity 51b may have a region that accommodates the pressing body 53 and the laminate 43 inside similarly to the pressing body region 51c and the first molding space region 51d, and may also include a region that does not accommodate the pressing body 53 inside but only accommodates the laminate 43 similarly to the second molding space region 51e. If the cavity 51b is one region that is not divided, pressing force applied to the pressed surface of the laminate 43 can be applied to the entire laminate 43, and heat curing can be performed while favorably pressing the laminate 43.

Note that in the mold 50, the specific configurations of the mold main body (the female mold portion 51, the side surface lid mold portion 52, the end surface lid mold portion, and the caul plate 54) and the pressing body 53 are substantially similar to those of above Embodiment 1 or 2, and thus the detailed description thereof is omitted. Similarly, the method of assembling the mold main body (including disposing of the laminate 43 and the pressing body 53 in the cavity 51b), the method for manufacturing a composite material molded product using the mold 50, and so on are also similar to those of above Embodiment 1, and thus the detailed description thereof is omitted. Furthermore, in the mold 50, as in above Embodiment 2, the heating part 17 may be provided on the female mold portion 51 or the like.

Embodiment 4

In each of the molds 10A-10F or the mold 50 described in above Embodiments 1 to 3, the surface on the hollow side or the inside of the bent portion or the curved portion in the transverse section of the composite material molded product is a pressed surface. However, the present disclosure is not limited to this, and a surface on the outside of the bent portion or the curved portion may be the pressed surface. In present Embodiment 4, such a mold will be specifically described with reference to FIGS. 14-16.

Figure 14:
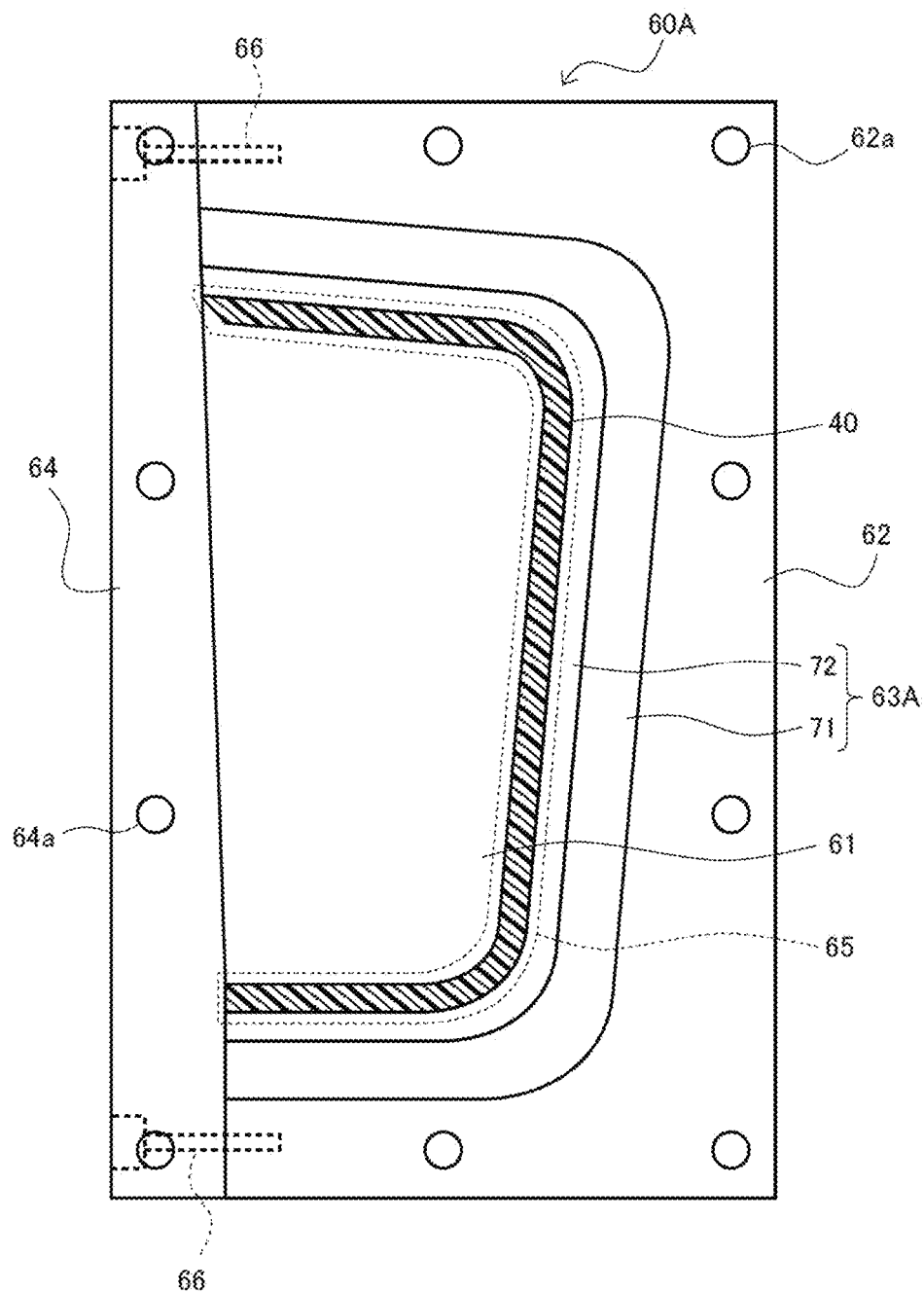
FIG. 14 is a schematic end surface view illustrating an example of a mold for manufacturing a composite material molded product according to Embodiment 4 of the present disclosure.

As illustrated in FIG. 14, a mold 60A according to present Embodiment 4 includes a first mold portion 61, a second mold portion 62, a pressing body 63A, a base plate 64, and so on, and a molding space 65 is formed between the first mold portion 61 and the second mold portion 62. A laminate 40 is held in the molding space 65, and the laminate 40 is cured to form the C-shaped molded material 20A described in above Embodiment 1 or 2. Note that in FIG. 14, the region corresponding to the molding space 65 is illustrated by enclosing with a dotted line as in FIGS. 2-3 and 8-11.

Figure 15:
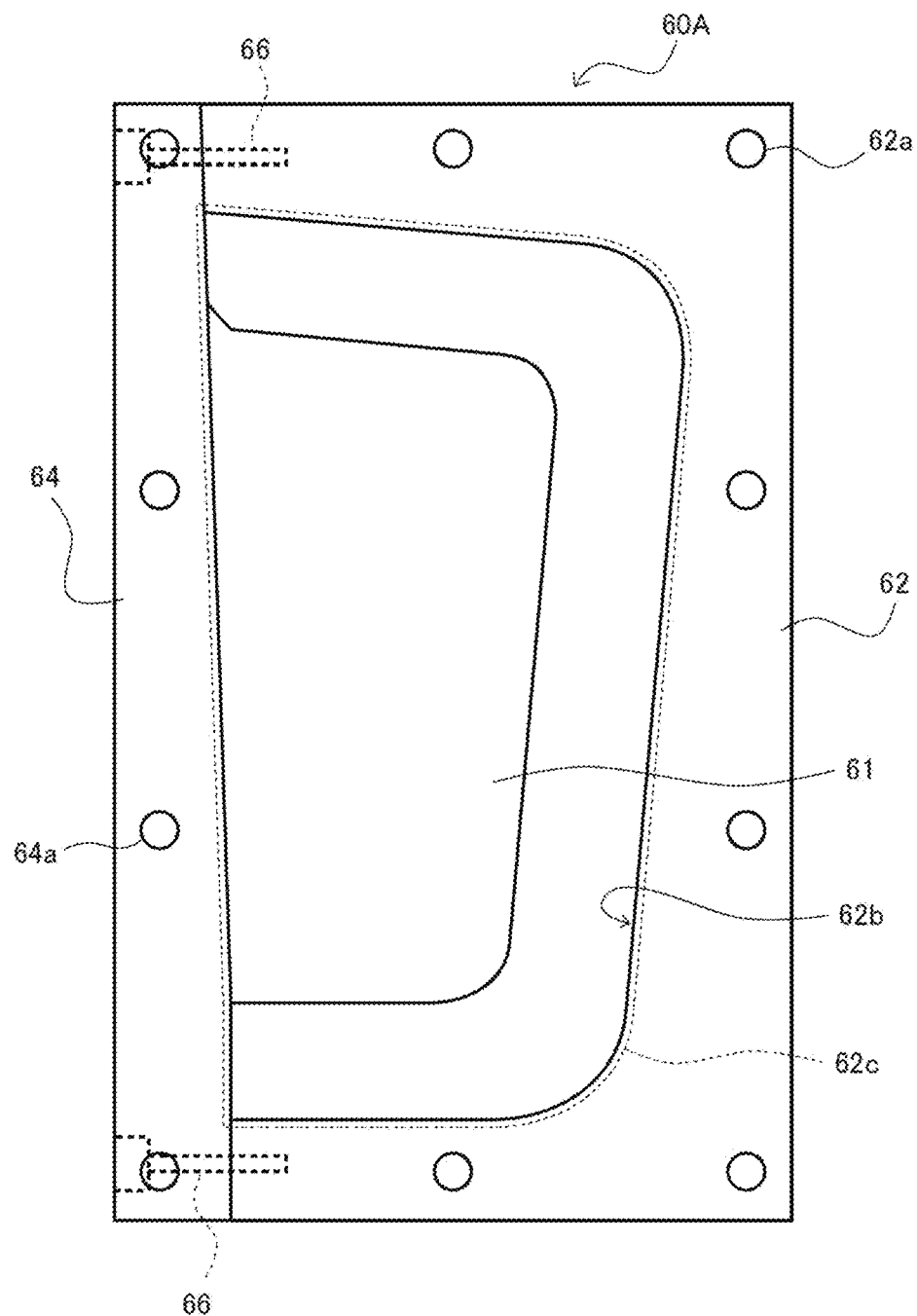
FIG. 15 is a schematic end surface view describing a cavity in the mold for manufacturing the composite material molded product illustrated in FIG. 14.

As illustrated in FIG. 14 and FIG. 15, the first mold portion 61 is fitted in the second mold portion 62. In this fitting state, as illustrated in FIG. 15, a cavity 62b is formed between the first mold portion 61 and the second mold portion 62. Therefore, the first mold portion 61 functions as a "male mold portion", and the second mold portion 62 functions as a "female mold portion". Further, as illustrated in FIG. 15, the second mold portion 62 has a recessed space 62c in which the first mold portion 61 can be fitted. The pressing body 63A, the laminate 40, and the first mold portion 61 are disposed in the recessed space 62c, which is closed by the base plate 64.

Similarly to the side surface lid mold portion 12 or the side surface lid mold portion 52 in the molds 10A-10F or the mold 50 described in above Embodiments 1 to 3, the base plate 64 is fixed to the second mold portion 62 so as to substantially hermetically seal the cavity 62b. However, although the side surface lid mold portion 12 or the side surface lid mold portion 52 itself functions as the "male mold portion", in present Embodiment 4, the first mold portion 61 as the "male mold portion" exists as a separate member from the base plate 64, and thus the base plate 64 functions not as the "male mold portion" but as a "side surface lid portion" that seals a side surface of the mold 60A. In addition, the base plate 64 can also be regarded as a "third mold portion" with respect to the first mold portion 61 and the second mold portion 62.

Also in the mold 60A according to present Embodiment 4, the first mold portion 61, the second mold portion 62, the base plate 64, and so on have an elongated shape extending along a longitudinal direction (axial member direction) of the laminate 40 to be the C-shaped molded material 20A (see FIG. 3), as in above Embodiments 1 to 3.

As illustrated in FIG. 14 or FIG. 15, the first mold portion 61, the second mold portion 62, and the base plate 64 are assembled to be fixed to each other by fastening members 66, similarly to the molds 10A-10F or the mold 50 described in above Embodiments 1 to 3. At this time, end surface lid mold portions are fixed to both ends of the second mold portion 62 and the base plate 64. Therefore, the second mold portion 62 and the base plate 64 are provided with a plurality of fastening holes 62a, 64a into which the fastening members 66 are inserted. Since bolts can be used as the fastening members 66 as in above Embodiments 1 to 3, the fastening holes 62a, 64a may be configured as thread groove holes or the like as in above Embodiments 1 to 3.

Therefore, the second mold portion 62, the base plate 64, and the end surface lid mold portion fixed to each other by the fastening members 66, and the first mold portion 61 fitted in the second mold portion 62 form a "mold main body". Then, the pressing body 63A is also a member configured as a separate body from the mold main body as in above Embodiments 1 to 3.

The pressing body 63A is constituted of two members, an expansion core part 71 and a pressure distribution part 72, similarly to the pressing body 13A (see FIGS. 2-4), the pressing body 13C (see FIG. 9), or the pressing body 13D (see FIG. 10) in above Embodiment 1. The expansion core part 71 functions as a core (center or main body) of pressing by thermal expansion in the pressing body 63A because of a relatively large thermal expansion coefficient. The pressure distribution part 72 has a thermal expansion coefficient smaller than that of the expansion core part 71 and is located on a pressed surface side as viewed from the expansion core part 71, and thus pressing force different for each portion by the expansion core part 71 is distributed and equalized. Thus, when viewed as the entire pressing body 63A, the pressing force by the pressed surface can be entirely equal.

In the example illustrated in FIG. 14, an outside (outer surface) of the laminate 40 is the pressed surface, the entire outer surface of the laminate 40 is covered by the pressure distribution part 72, and an outside of the pressure distribution part 72 is covered by the expansion core part 71. In other words, inside the second mold portion 62 (inside the recessed space 62c), the expansion core part 71 is positioned to be in contact with the inner surface of the second mold portion 62 on the outermost side, the pressure distribution part 72 is positioned to be in contact with the inside of the expansion core part 71, the laminate 40 is positioned to be in contact with the inside of the pressure distribution part 72, and the first mold portion 61 is positioned to be in contact with the inside of the laminate 40.

Note that the specific configurations of the expansion core part 71 and the pressure distribution part 72 constituting the pressing body 63A are not particularly limited, and configurations similar to the expansion core part 31, the pressure distribution part 32, or the expansion core part 33 described in above Embodiment 1 can be employed (for example, a plurality of convex portions or concave portions may be formed on the entire outer surface similarly to the expansion core part 33). In addition, as in the case of the pressing body 13B in above Embodiment 1, the pressing body 63A may be configured only of a single member corresponding to the expansion core part 71, or may include a member other than the expansion core part 71 and the pressure distribution part 72.

Here, as illustrated in FIG. 15, a convex side surface (convex surface) of the first mold portion 61 forms a part of the inner surface of the cavity 62b. Therefore, the first mold portion 61 has an "inner surface shape" corresponding to the shape other than the pressed surface of the laminate 40 (C-shaped molded material 20A) in the mold main body. Note that when the first mold portion 61 alone is viewed, the convex surface can also be called an "outer surface". However, as illustrated in FIG. 15, in a state that the recessed space 62c of the second mold portion 62 is sealed by the base plate 64, the first mold portion 61 is disposed inside the recessed space 62c. Therefore, the convex surface of the first mold portion 61 constitutes an inner surface shape corresponding to the shape other than the pressed surface of the composite material molded product when viewed as the entire mold 60A.

Although the pressing body 63A is not disposed in the cavity 62b illustrated in FIG. 15, as illustrated in FIG. 14, in a state that the pressing body 63A is disposed in the cavity 62b, a molding space 65 (illustrated by a dotted line) is formed between the convex surface of the first mold portion 61 constituting the inner surface of the cavity 62b and the inner surface of the pressing body 63A, namely, the pressure molding surface. Therefore, the laminate 40 is disposed between the first mold portion 61 and the pressing body 63A.

Here, for example, in the mold 10A according to above Embodiment 1, as illustrated in FIG. 2, the pressing body 13A is disposed inside the bent portion (or the curved portion or the hollow) of the laminate 40. Therefore, in the laminate 40 (C-shaped molded material 20A), the surface on the inside of the bent portion (or the curved portion or the hollow) is the pressed surface (see the block arrows M in FIG. 4 and FIG. 7A). On the other hand, in the mold 60A according to present Embodiment 4, as illustrated in FIG. 14, the pressing body 63A is disposed outside the bent portion of the laminate 40. Therefore, in the laminate 40 (C-shaped molded material 20A), the surface on the outside of the bent portion (or the curved portion or the hollow) is the pressed surface (in present Embodiment 4, therefore, in the composite material molded product exemplified in FIG. 7A-FIG. 7F, the surface opposite to the surface indicated by the block arrow M is the pressed surface).

Further, in the mold 10A according to above Embodiment 1, as illustrated in FIG. 2, the pressure molding surface of the pressing body 13A is the outer surface of the pressing body 13A in order to abut on the inner surface of the laminate 40. On the other hand, in the mold 60A according to present Embodiment 4, as illustrated in FIG. 14, the pressing body 63A abuts on the outside of the bent portion of the laminate 40. Therefore, the pressure molding surface of the pressing body 63A is the inner surface of the pressing body 63A.

Further, based on the recessed space 62c of the second mold portion 62, it can be said that the cavity 62b is a space formed between the first mold portion 61 and the second mold portion 62 when the first mold portion 61 is fitted in the recessed space 62c. Further, it can be said that the molding space 65 is a space formed between the pressing body 63A and the convex surface of the first mold portion 61 when the pressing body 63A is disposed in the cavity 62b. Therefore, the pressing body 63A is disposed in the recessed space 62c of the second mold portion 62 so that the pressure molding surface of the pressing body 63A opposes the first mold portion 61. In addition, the laminate 40 is accommodated in the molding space 65 formed between the inner surface of the cavity 62b (the convex surface of the first mold portion 61) and the inner surface of the pressing body 63A, namely, the pressure molding surface.

When the first mold portion 61, the second mold portion 62, the base plate 64, and the end surface lid mold portion, which are the mold main body, are assembled with the fastening members 66, the pressing body 63A and the laminate 40 are disposed in the cavity 62b as described above. The pressing body 63A is disposed on a deepest side of the cavity 62b (a "bottom surface" of the recessed space 62c of the second mold portion 62) so as to expose the pressure molding surface. The laminate 40 is placed on the pressure molding surface of the pressing body 63A. Then, the first mold portion 61 is disposed to be overlapped with the laminate 40. In this state, the first mold portion 61 is fitted in the second mold portion 62. Thus, by disposing the pressing body 63A in the cavity 62b of the mold main body, the molding space 65 (the region enclosed with a dotted line in FIG. 14) is formed between the inner surface of the cavity 62b and the inner surface of the pressing body 63A.

The laminate 40 is accommodated so as to be filled in the molding space 65. Further, since the cavity 62b constituted of the first mold portion 61 and the second mold portion 62 is sealed by the base plate 64 and the end surface lid mold portion, the molding space 65 is also substantially hermetically sealed. When the mold 60A is heated in this state, the pressing body 63A thermally expands. Since the molding space 65 is substantially hermetically sealed, the pressing force due to thermal expansion does not substantially leak to the outside, and presses the pressed surface (outer surface) of the laminate 40. Consequently, the laminate 40 is heat cured in a pressed state, and thus the laminate 40 can be molded into the C-shaped molded material 20A (composite material molded product) of a predetermined shape.

Moreover, in the inside of the mold 60A, the thermosetting resin (composition) is softened by heating and spreads over the entire molding space 65. Thus, together with the pressing force due to thermal expansion of the pressing body 63A, hydrostatic pressurization by the softened thermosetting resin also occurs. Therefore, in the obtained C-shaped molded material 20A, since favorable pressing force is generated in the entire molding space 65, it is possible to suppress occurrence of defects such as porosity accompanying insufficient pressing.

Further, in the mold 60A, the convex surface of the first mold portion 61 forms an inner surface shape corresponding to the shape other than the pressed surface in the cavity 62b. Thus, it is possible to dispose the mold main body rather than the pressing body 63A inside the bent portion or the curved portion of the composite material molded product. The mold main body is generally made of metal and is a harder material than the pressing body 63A. Thus, the laminate 40 can be formed by stacking prepregs on the convex surface of the hard first mold portion 61. Stacking operation is relatively easier by stacking the prepregs on a surface of a hard material than on a soft material such as the pressing body 63A.

Moreover, in the conventional manufacturing method of a general composite material molded product, when forming a bent portion or a curved portion, prepregs are stacked on a base material made of metal. Thus, a stacking step of stacking prepregs on the convex surface of the first mold portion 61 to form the laminate 40 is substantially similar to the conventional stacking step. Therefore, even if the mold 60A is configured to include the pressing body 63A, it is possible to suppress or avoid complication of the manufacturing processes of the composite material molded product.

Furthermore, the first mold portion 61 constituted of a hard material abuts on the inner surface of the bent portion or curved portion of the composite material molded product. Therefore, when the first mold portion 61 is removed from the composite material molded product, even if an insertion member such as a wedge or a spatula is inserted between the inside of the composite material molded product and the first mold portion 61, there is almost no possibility that the convex surface of the first mold portion 61 will be damaged. In other words, the first mold portion 61 can be removed from the inside of the composite material molded product using an insertion member such as a wedge or a spatula. Therefore, complication of demolding operation can be suppressed or avoided.

Here, the specific configuration of the pressing body 63A provided in the mold 60A is not particularly limited. The pressing body 63A may be constituted of, for example, a single thermal expansion member, similarly to the pressing body 13B provided in the mold 10B described in the modification example of above Embodiment 1. Further, the pressing body 63A may be constituted of the expansion core part 31 and the pressure distribution part 32 as in the mold 10A described in above Embodiment 1. Alternatively, as in the mold 10C described in the modification example of above Embodiment 1, the pressed surface may be dimpled, or it may be configured to include a hollow box part 35 as in the mold 10D described likewise in the modification example.

Figure 16:
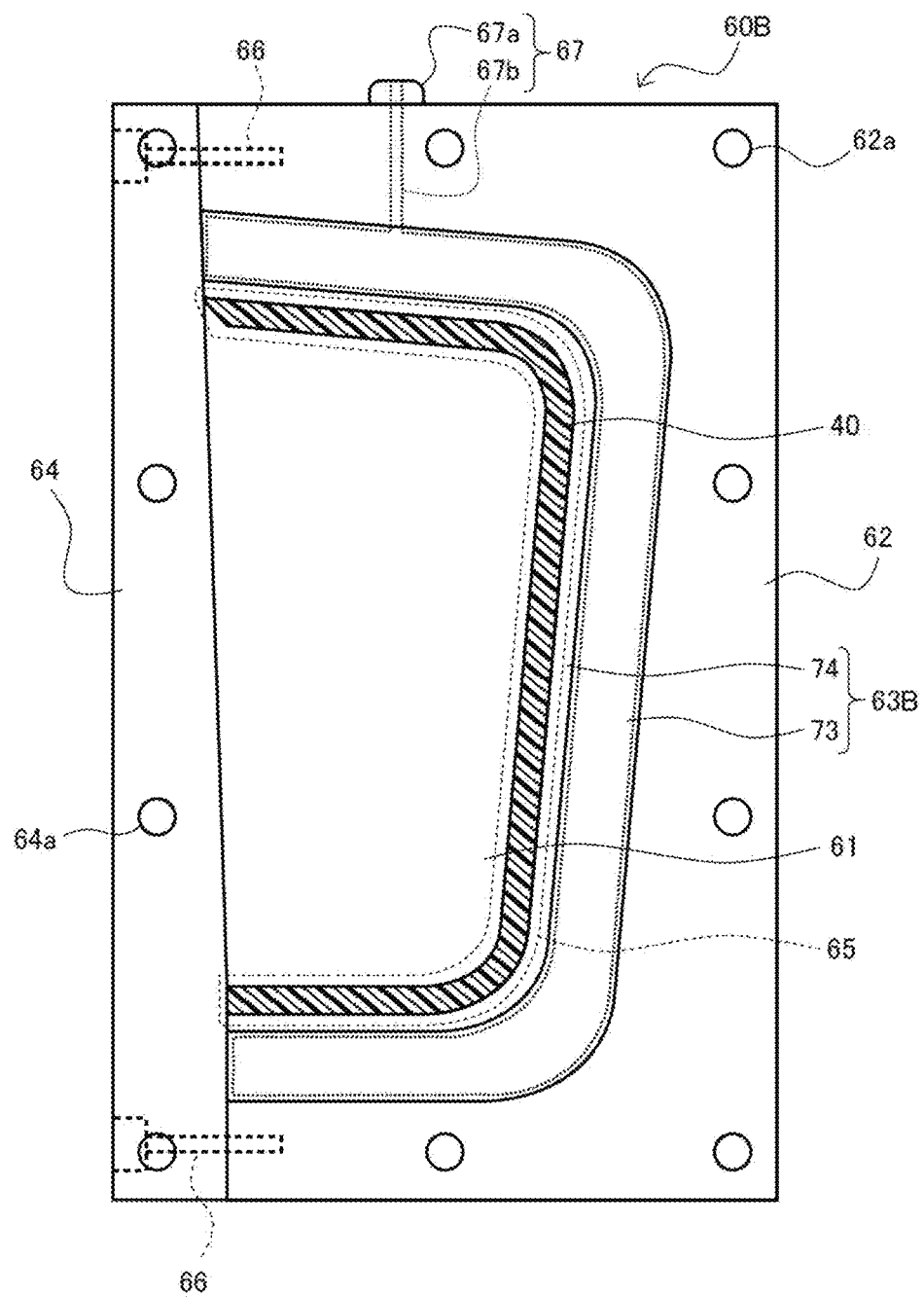
FIG. 16 is a schematic end surface view illustrating another example of the mold for manufacturing the composite material molded product illustrated in FIG. 14.

Alternatively, the pressing body in present Embodiment 4 may be a hollow body instead of an entirely homogeneous solid member (solid) like the expansion core part 71 of the pressing body 63A. For example, as illustrated in FIG. 16, a mold 60B of the modification example in present Embodiment 4 has a first mold portion 61, a second mold portion 62, a pressing body 63B, a base plate 64, and so on, similarly to the above-described mold 60A, and the basic configuration thereof is similar to that of the mold 60A. Therefore, although the pressing body 63B is also constituted of the expansion core part 73 and the pressure distribution part 74, this expansion core part 73 is not a solid body that is entirely homogeneous like the expansion core part 71 described above but a hollow body. In FIG. 16, the internal space of the expansion core part 73 is illustrated with a dotted line.

The internal space of the expansion core part 73 can be communicated with the outside of the mold main body via a pressure hole 67. The pressure hole 67 is constituted of, for example, a pressure valve 67a provided on a side surface of the second mold portion 62, and a through hole 67b which is formed to penetrate the second mold portion 62 and communicates this pressure valve 67a with an internal space of the pressing body 63B. Then, the outer surface of the laminate 40 can be pressed by the pressure molding surface of the pressing body 63B by blowing compressed air from the pressure hole 67 to expand the pressing body 63B.

As described above, when the expansion core part 73 is configured to blow compressed air, it is easy to adjust the pressing force due to expansion as compared with the solid expansion core part 71 described above. Thus, the thickness of the pressure distribution part 74 can be relatively small (thin) as compared with the pressure distribution part 72 of the pressing body 63A described above. In addition, the specific thickness of the pressure distribution part 72 is not specifically limited, and can be set appropriately according to various conditions.

Here, more specific configurations of the molds 60A, 60B according to present Embodiment 4 and a method for manufacturing a composite material molded product using the molds 60A, 60B are similar to those of the molds 10A-10F or the mold 50 and the manufacturing method using them, which are described in above Embodiments 1 to 3. Therefore, the more detailed description of the molds 60A, 60B other than the above description is omitted. In other words, the various configurations or methods and the like described for the molds 10A-10F or the mold 50 in above Embodiments 1 to 3 can be applied to the molds 60A, 60B according to present Embodiment 4.

Thus, a mold for manufacturing a composite material molded product according to the present disclosure is a mold used when manufacturing a composite material molded product made of a composite material constituted of at least a thermosetting resin composition and a fiber material and having a cross-sectional shape including at least one of a hollow, a bent portion, and a curved portion in a transverse section thereof, the mold used for heat curing a laminate of prepregs obtained by impregnating the fiber material with the thermosetting resin composition and half curing the thermosetting resin composition, in which when a surface on the hollow side or an inside or outside of the bent portion or the curved portion is a pressed surface in the transverse section of the composite material molded product, the mold includes a pressing body that is thermally expandable and has a pressure molding surface having a shape corresponding to a shape of the pressed surface, and a mold main body provided with a cavity accommodating the laminate and the pressing body inside, the cavity including an inner surface shape corresponding to a shape other than the pressed surface, in which the mold main body is configured such that the cavity is sealed in a state that the pressing body is disposed in the cavity, and the laminate is accommodated in a molding space formed between an inner surface of the cavity and the pressure molding surface of the pressing body.

Embodiments of the present application yield an effect that a mold or a manufacturing method can be provided that is capable of shaping both an outer surface and an inner surface into desired shapes in a composite material molded product having a hollow portion, a bent portion, or a curved portion in a transverse section thereof.

With the above configurations, by heating the pressing body disposed in the cavity by heating the mold main body which is a matched die, the pressing body expands and presses the pressed surface of the laminate in the molding space. Therefore, in a composite material molded product having a hollow, a bent portion, or a curved portion, the outer surface or the inner surface (in the case of hollow, the inner surface) thereof is set as a pressed surface, and the pressing body is made to abut on the pressed surface and heating is performed, not only a surface other than the pressed surface but also the pressed surface can be formed into a desired shape. Thus, a composite material molded product having a hollow portion, a bent portion, or a curved portion in a transverse section thereof can be molded into a desired shape.

In addition, since the pressing body thermally expands inside the mold main body and presses the laminate, it is not necessary to perform heating accompanied by pressurization as in an autoclave, and the composite material molded product can be molded into a predetermined shape only by a general heating device such as an oven. Moreover, since the cavity can be sealed in a state in which the laminate is accommodated, it is not necessary to bag the mold before heating or to debag the mold after heating. As a result, the manufacturing processes of the composite material molded product can be greatly simplified.

Furthermore, the laminate is accommodated in the closed molding space in the cavity and heat cured while being entirely pressed by thermal expansion of the pressing body. Therefore, in the obtained composite material molded product, the cured product of the thermosetting resin composition hardly leaks out of the cavity at an end thereof. At this time, the thermosetting resin (composition) is softened by heating and spreads over the entire molding space. Thus, along with pressing force due to thermal expansion of the pressing body, hydrostatic pressurization by the softened thermosetting resin also occurs. Therefore, in the obtained composite material molded product, since more favorable pressing force is generated in the entire molding space, it is possible to effectively suppress occurrence of defects such as porosity accompanying insufficient pressing.

Further, since the thermosetting resin (composition) hardly leaks from the molding space, an excess portion hardly occurs in the obtained composite material molded product. Accordingly, the trimming operation becomes unnecessary in the obtained composite material molded product, and since the trimming operation is not necessary, it is possible to avoid exposure of fibers occurring at a trim end. Therefore, it is not necessary to apply an edge seal to the end of the composite material molded product in order to prevent moisture absorption. As a result, the manufacturing processes can be further simplified.

In addition, since the laminate is pressed using a pressing body, there is no need to press the mold even though it is a matched die. Moreover, by adjusting the sizes or shapes of the mold and the pressing body, composite material molded products of various sizes or shapes can be manufactured, and favorable pressure can be applied in all directions from the pressing body to the pressed surface of the laminate. Thus, molding of a complex shape is also possible.

The mold for manufacturing the composite material molded product having the above configuration may be configured such that the pressed surface of the composite material molded product is a surface on the hollow side or the inside of the bent portion or the curved portion, the pressure molding surface of the pressing body is an outer surface of the pressing body, and in the mold main body, in a state that the pressing body is disposed in the cavity, the laminate is accommodated in a molding space formed between the inner surface of the cavity and the outer surface of the pressing body.

Further, the mold for manufacturing the composite material molded product having the above configuration may be configured such that the pressed surface of the composite material molded product is a surface on the outside of the bent portion or the curved portion, the pressure molding surface of the pressing body is an inner surface of the pressing body, and in the mold main body, in a state that the pressing body is disposed in the cavity, the laminate is accommodated in a molding space formed between the inner surface of the cavity and the inner surface of the pressing body.

Further, the mold for manufacturing the composite material molded product having the above configuration may be configured such that the mold main body includes a female mold portion provided with the cavity, and a lid mold portion that seals the cavity in a state that the laminate and the pressing body are disposed in the cavity of the female mold portion.

Further, the mold for manufacturing the composite material molded product having the above configuration may be configured such that the mold main body includes a first mold portion having the inner surface shape, and a second mold portion having a recessed space in which the first mold portion is fitted, in which by fitting the first mold portion and the second mold portion, the cavity is formed therebetween, and the pressing body is disposed in the recessed space of the second mold portion so that the pressure molding surface of the pressing body opposes the first mold portion.

Further, the mold for manufacturing the composite material molded product having the above configuration may be configured such that a cross section of the composite material molded product is a shape having a plate-shaped main body portion and two flange portions bent in a same direction from both edges of the main body portion, and the pressing body has an outer surface shape corresponding to a shape of the pressed surface between the two flange portions and the main body portion.

Further, the mold for manufacturing the composite material molded product having the above configuration may be configured such that the pressing body includes an expansion core part that thermally expands due to heating and a pressure distribution part that is provided on a side of the composite material molded product with respect to the expansion core part and distributes pressing force by the expansion core part to the entire pressed surface.

Further, the mold for manufacturing the composite material molded product having the above configuration may be configured such that a thermal expansion coefficient of the expansion core part is larger than a thermal expansion coefficient of the pressure distribution part.

Further, the mold for manufacturing the composite material molded product having the above configuration may be configured such that the expansion core part has a concavo-convex structure that adjusts pressing force due to thermal expansion.

Further, the mold for manufacturing the composite material molded product having the above configuration may be configured such that the pressing body includes a hollow box part that is located inside the pressing body and is deformable inward accompanying thermal expansion of the pressing body.

Further, the mold for manufacturing the composite material molded product having the above configuration may be configured such that the mold main body includes a heating part that heats the mold main body.

Further, the mold for manufacturing the composite material molded product having the above configuration may be configured such that the composite material molded product is an aircraft part.

The method for manufacturing a composite material molded product according to the present disclosure is a method for manufacturing a composite material molded product made of a composite material constituted of at least a thermosetting resin composition and a fiber material and having a cross-sectional shape including at least one of a hollow, a bent portion, and a curved portion in a transverse section thereof, in which when the hollow side or an inside or outside of the bent portion or the curved portion is a pressed surface in the transverse section of the composite material molded product, the method is configured to include using a mold including a pressing body that is thermally expandable and has a pressure molding surface having a shape corresponding to a shape of the pressed surface, and a mold main body provided with a cavity including an inner surface shape corresponding to a shape other than the pressed surface, disposing the laminate and the pressing body in the cavity so that the pressure molding surface of the pressing body abuts on a laminate of prepregs obtained by impregnating the fiber material with the thermosetting resin composition and half curing the thermosetting resin composition, and fixing the mold main body so as to seal the cavity, and heating the mold without pressing from outside, so as to cure the laminate.

The method for manufacturing a composite material molded product having the above configuration may be configured such that the pressed surface of the composite material molded product is a surface on the hollow side or the inside of the bent portion or the curved portion, the pressure molding surface of the pressing body is an outer surface of the pressing body, and when the pressing body and the laminate are disposed in the cavity, the laminate is accommodated in a molding space formed between the inner surface of the cavity and the outer surface of the pressing body.

Further, the method for manufacturing the composite material molded product having the above configuration may be configured such that the pressed surface of the composite material molded product is a surface on the outside of the bent portion or the curved portion, the pressure molding surface of the pressing body is an inner surface of the pressing body, and when the pressing body and the laminate are disposed in the cavity, the laminate is accommodated in a molding space formed between the inner surface of the cavity and the inner surface of the pressing body.

From the above description, many improvements and other embodiments of the present application will be apparent to those skilled in the art. Accordingly, the above description should be construed only as example, and is provided for the purpose of teaching those skilled in the art the best mode of carrying out the present application. The structural and/or functional details may be substantially altered without departing from the spirit of the present application.

Further, the present application is not limited to the description of above Embodiments, and various modifications are possible within the scope described in the claims, and embodiments obtained by appropriately combining the technical means disclosed in different embodiments and plural modification examples are also included in the technical scope of the present application.

The present application can be widely and preferably used in the field of manufacturing composite material molded products, particularly in the field of manufacturing aircraft parts made of composite materials or parts of other transportation machine.

REFERENCE SIGNS LIST 10A-10F, 50, 60A, 60B mold
11, 51 female mold portion (mold main body)
11a, 12a, 14a, 51a, 52a, 62a, 64a fastening hole
11b, 51b, 62b cavity
12 side surface lid mold portion (lid mold portion, mold main body)
13A-13D, 53, 63A, 63B pressing body
14, 54 side surface lid mold portion (lid mold portion, mold main body)
15, 55, 65 molding space
16, 56, 66 fastening member
17 heating part
20A C-shaped molded material (composite material molded product)
20B J-shaped molded material (composite material molded product)
20C L-shaped molded material (composite material molded product)
20D H-shaped molded material (composite material molded product)
20E, 20F hollow material
21 main body portion (web)
22 flange portion
23 reverse cut portion
24 distal end surface
25 hollow portion
31, 33, 71, 73 expansion core part
32, 72, 74 pressure distribution part
34 plurality of convex portions (concavo-convex structure)
35 hollow box part
40 laminate
41 base material
42 matrix material
54 caul plate
51c pressing body region (part of cavity)
51d first molding space region (part of cavity)
51e second molding space region (part of cavity)
61 first mold portion (mold main body)
62 second mold portion (mold main body)
64 base plate (side surface lid portion)
67 pressure hole

The invention claimed is:

1. A method for manufacturing a composite material molded product, the method comprising:
    disposing a laminate of prepregs in a cavity between an outer mold and an inner mold of a mold main body;
    disposing a pressure distributor in the cavity;
    disposing an expansion core in the cavity, wherein the expansion core expands itself, the expansion core is in contact with an outer surface of the pressure distributor and an inner surface of the pressure distributor is in contact with a surface of the laminate before expansion of the expansion core;
    sealing the cavity, between the outer mold to the inner mold, by fastening the inner mold to the outer mold with fasteners;
    heating the mold main body including the outer mold and the inner mold without pressing to expand the expansion core;
    curing the laminate; and
    distributing, during the curing, a pressing force to the laminate by the pressure distributor due to expansion of the expansion core, wherein
    the cavity is sealed so that a volume of the cavity does not change during the heating, the curing and the distributing,
    the laminate is formed into a C-shape
    the inner mold is positioned to be enclosed by a first portion of the laminate, a second portion of the laminate and a third portion of the laminate, such that the inner mold is in contact with the inner surface of the laminate,
    the pressure distributor is disposed so as to be contiguous over the first, second and third portions and in contact with the outer surface of the first, second and third portions,
    the expansion core covers the outer surface of the pressure distributor in a manner that is contiguous over the first, second and third portions, and
    the outer mold is positioned adjacent to the outer surface of the expansion core.

2. The method according to claim 1, wherein the expansion core thermally expands due to heating.

3. The method according to claim 2, wherein the expansion core has a concavo-convex structure that adjusts pressing force due to thermal expansion.

4. The method according to claim 2, wherein a thermal expansion coefficient of the expansion core is larger than a thermal expansion coefficient of the pressure distributor.

5. The method according to claim 1, wherein the heating includes heating the mold main body with a heater.

6. The method according to claim 1, wherein the blowing the compressed air is performed via a pressure hole communicating with an outside of the mold main body.

7. The method according to claim 1, wherein the expansion core includes dimples on an outer surface of the expansion core.

8. The method according to claim 1, wherein the pressure distributor is in contact with an entire outer surface of the first, second and third portions when viewed in a cross section of the laminate from a side.

9. The method according to claim 1, wherein the expansion core covers an entire outer surface of the pressure distributor when viewed in a cross section of the laminate from a side.

10. A method for manufacturing a composite material molded product, the method comprising:
disposing a laminate of prepregs in a cavity between an outer mold and an inner mold of a mold main body:
disposing a pressure distributor in the cavity;
disposing an expansion core in the cavity, wherein the expansion core expands itself, the expansion core is in contact with an outer surface of the pressure distributor and an inner surface of the pressure distributor is in contact with a surface of the laminate before expansion of the expansion core;
sealing the cavity, between the outer mold to the inner mold, by fastening the inner mold to the outer mold with fasteners;
blowing compressed air into the expansion core to expand the expansion core;
curing the laminate; and
distributing, during the curing, a pressing force to the laminate by the pressure distributor due to expansion of the expansion core, wherein the cavity is sealed so that a volume of the cavity does not change during the blowing, the curing and the distributing,
the laminate is formed into a C-shape,
the inner mold is positioned to be enclosed by a first portion of the laminate, a second portion of the laminate and a third portion of the laminate, such that the inner mold is in contact with the inner surface of the laminate,
the pressure distributor is disposed so as to be contiguous over the first, second and third portions and in contact with the outer surface of the first, second and third portions,
the expansion core covers the outer surface of the pressure distributor in a manner that is contiguous over the first, second and third portions, and
the outer mold is positioned adjacent to the outer surface of the expansion core.

11. The method according to claim 10, wherein the expansion core includes dimples on an outer surface of the expansion core.

12. The method according to claim 10, wherein the pressure distributor is in contact with an entire outer surface of the first, second and third portions when viewed in a cross section of the laminate from a side.

13. The method according to claim 10, wherein the expansion core covers an entire outer surface of the pressure distributor when viewed in a cross section of the laminate from a side.

* * * * *